Fig.2  Fig.3  Fig.4
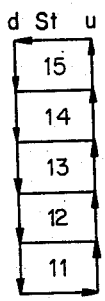 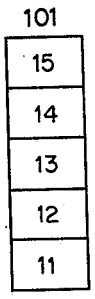   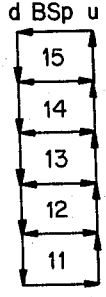
Fig.5
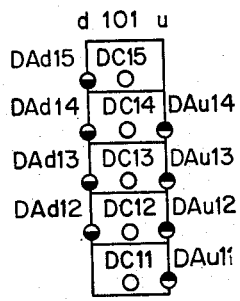 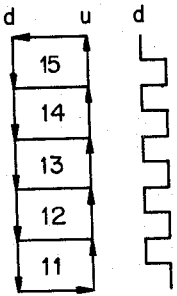 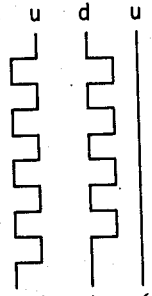 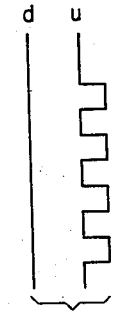 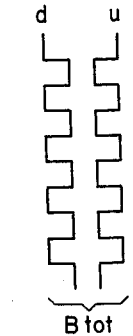
Fig.6
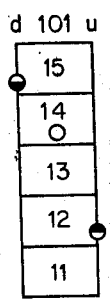 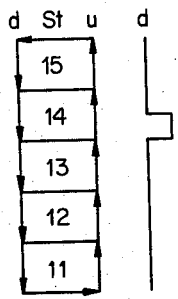 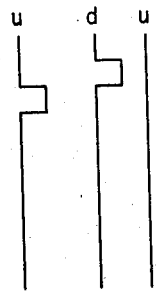 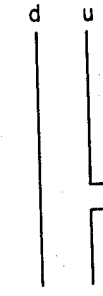 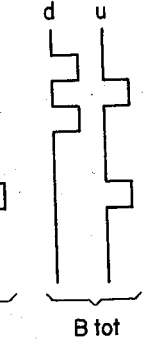

Fig. 7
Fig. 8
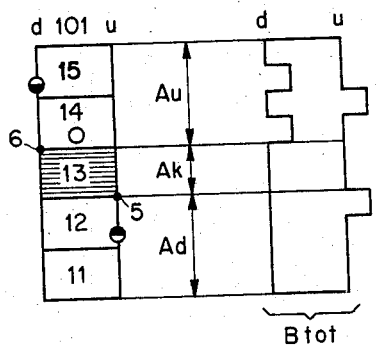
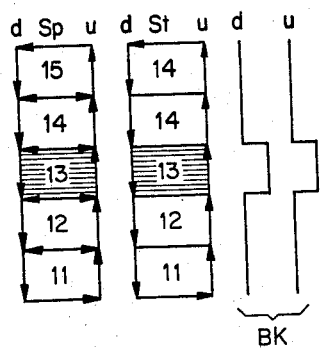
Fig. 9
Fig. 10
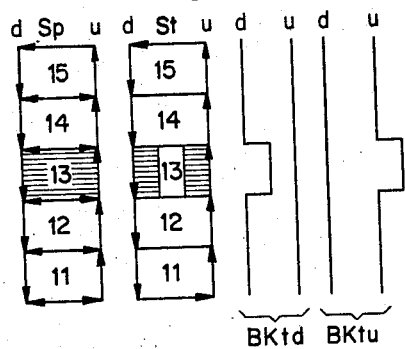
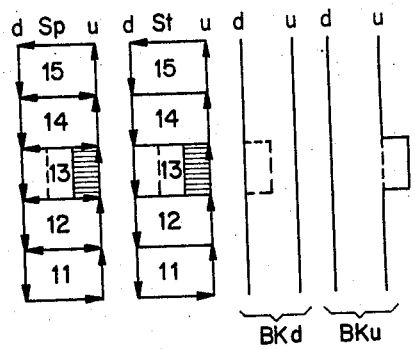
Fig. 11
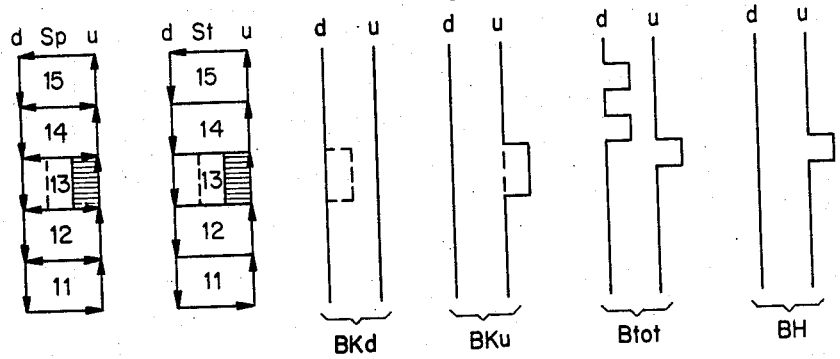

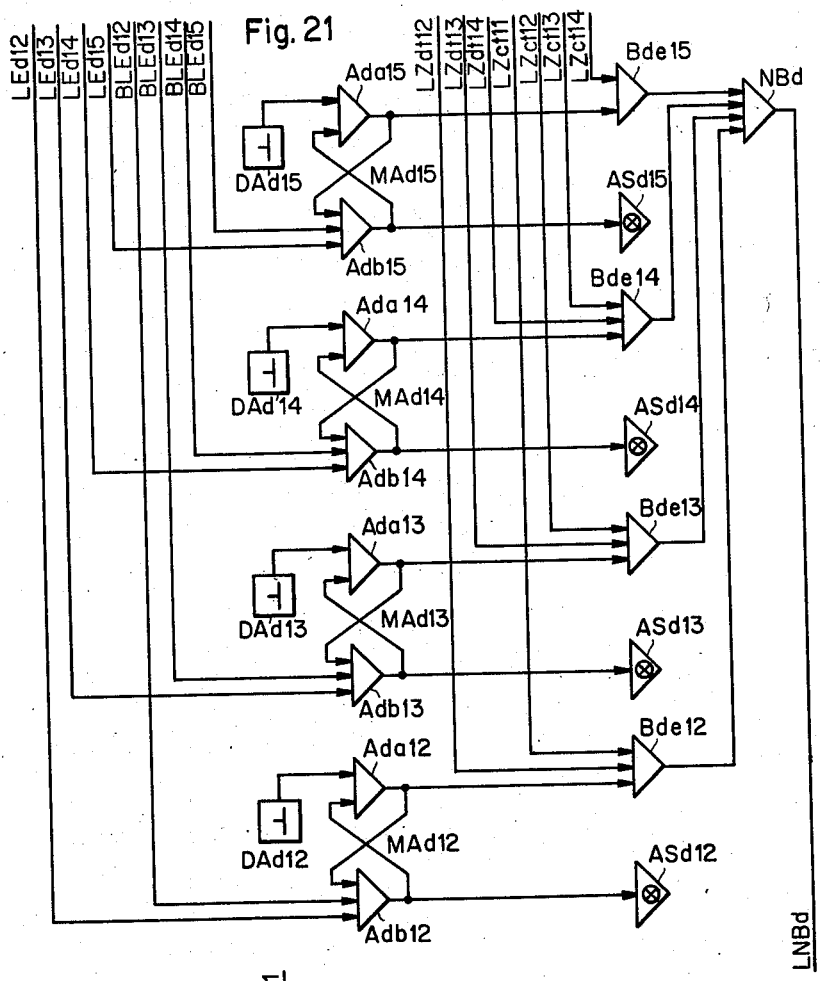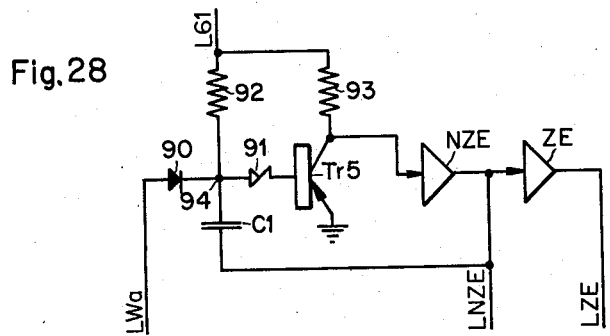

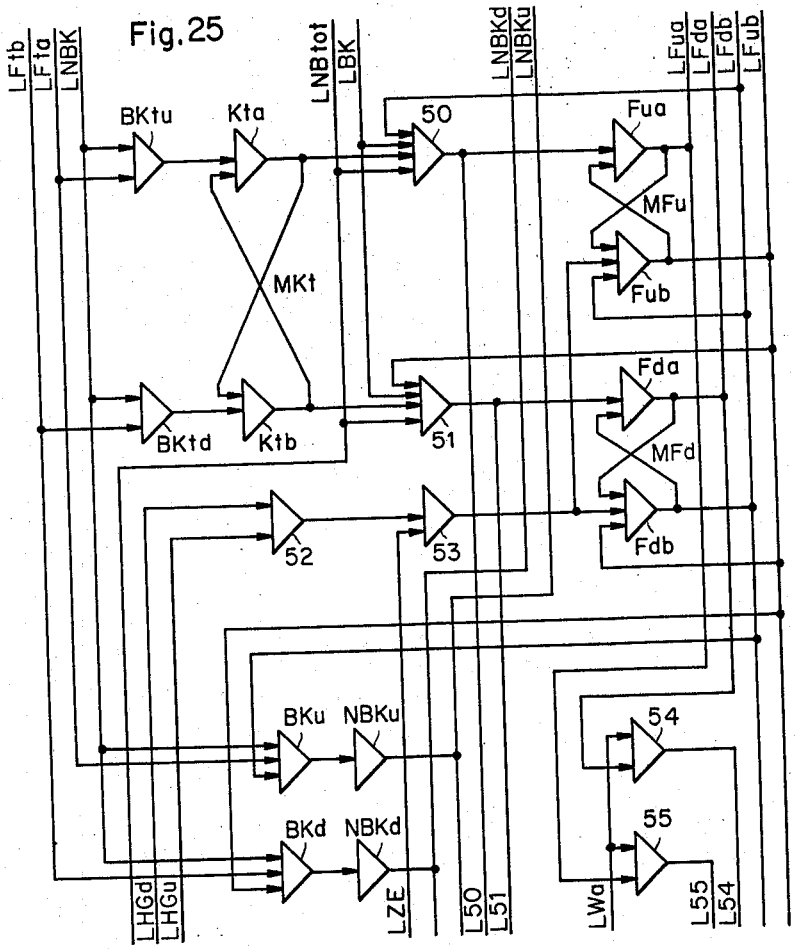
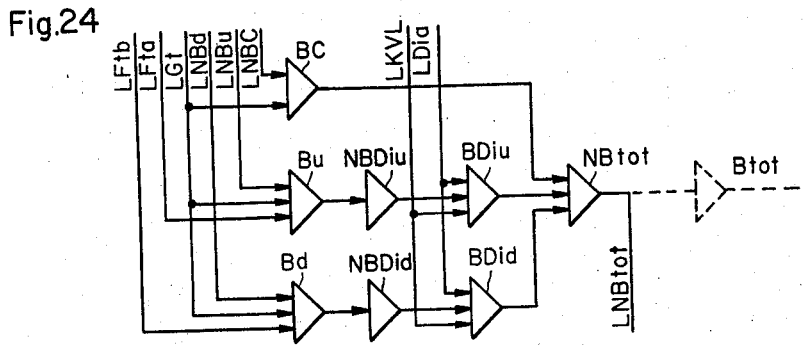

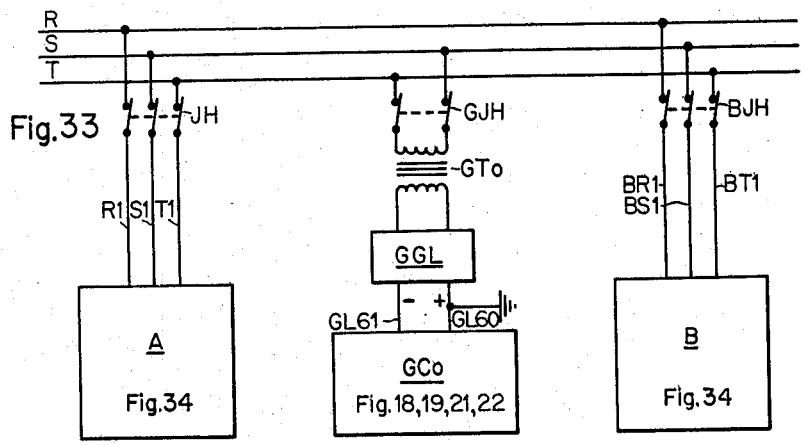
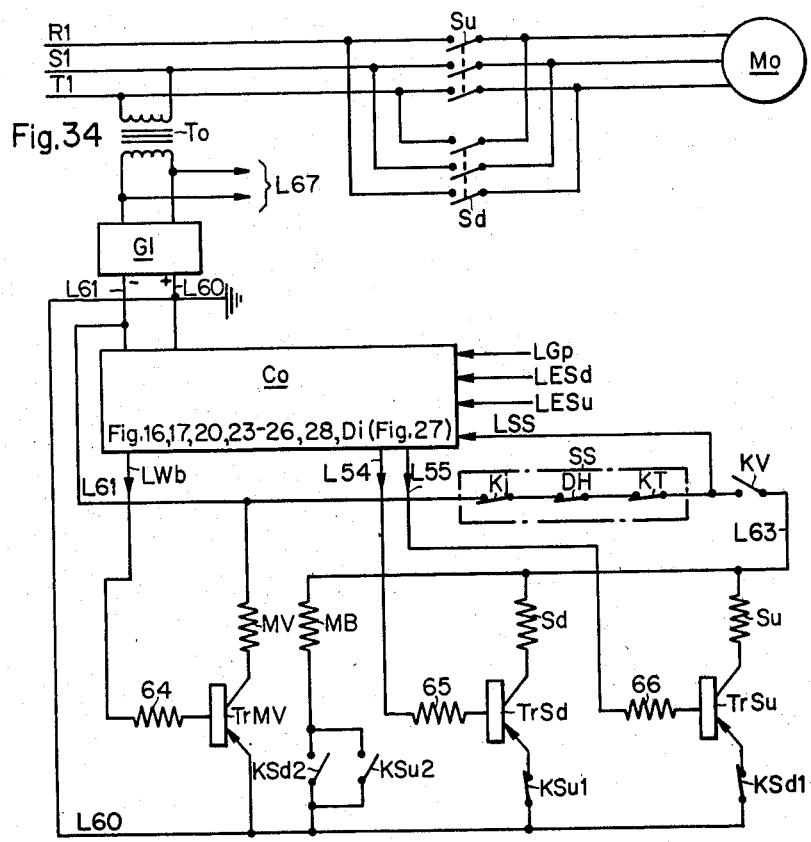

United States Patent Office 3,146,858
Patented Sept. 1, 1964

1

3,146,858
SOLID-STATE, CLOCK PULSE SYNCHRONIZED,
LOGICAL CONTROL SYSTEM FOR ELEVATORS
Marcel Leroux, Geneva, and Marcel Schibli, Zurich,
Switzerland, assignors to Schweizerische Wagons-
und Aufzugefabrik A.-G. Schlieren-Zurich, Schlieren,
Switzerland
Filed Dec. 27, 1960, Ser. No. 78,378
Claims priority, application Switzerland July 5, 1960
23 Claims. (Cl. 187—29)

The present invention relates to methods and apparatus for controlling elevator plants by means of solid state switching elements.

In general, the elevator controls in operation today make use of conventional relay techniques. This art has well known drawbacks, such as the occurrence of frequent disturbances resulting from dirtying and wear of the movable parts. Also quite often these conventional controls must take into consideration the relatively low switching speed of the switching elements. For this reason position-dependent intelligence must be represented in terms of contact positions.

It is a primary object of the present invention to make use of the high switching speeds of solid state elements to convert position-dependent intelligence into time-dependent intelligence for use in the control of the elevator plant.

In a known elevator control system the step-by-step switching device determining the position of the cabin has different statical elements while the main portion of the control is effected by means of conventional relay techniques.

The present invention is based on a so-called "collective control" meeting the following conditions. In such collective controls it is known to handle the instantaneous calls not according to their chronological arrival but in an order depending on the position and on the travel direction of the cabin. In order that an elevator cabin may attend each floor, floor-responsive or floor-bound command signal initiating means are required which are divided into groups of functionally separated devices. Such groups are: cabin call buttons, outer call buttons "up," outer call buttons "down" and means for determining the cabin position.

In order to increase the efficiency of elevator plants, two or more elevators provided with collective controls are connected into a so-called "group" whereby common outer call buttons are provided for all elevators. These buttons act on the elevators in accordance with the position and the travel directions of the cabins.

In collective controls the instantaneous calls are separated into "directional" and into "contra-directional" calls. A call is designated as a "directional" call when the travel direction it requires corresponds to the actual direction of travel of the cabin, whereby directional calls are attended to one after the other. A directional call arriving after the cabin has left a station may only be attended to after two changes of the travel direction. Further a call is designated as "contra-directional" call when the travel direction it requires asks for a change of the travel direction in which the cabin is actually running.

If no directional calls are present in the travel direction followed by the cabin, then the cabin will first respond to that contra-directional call which, with respect to the travel direction, is at the greatest distance from the cabin position.

The control according to the present invention is characterized by the use of a step-by-step switching device having positions according to the number of floors and operated by a time-dependent, uninterrupted signal sequence which scans the floor-bound intelligence of at least one elevator. Upon coincidence of signals supplied by such floor-bound intelligence with the signals of the corresponding positions of the time-depending step-by-step switching device, additional signals are produced which, through the formation of functionally separated sums, form signal bands for each scanning cycle.

A further feature of the invention consists in that, by the cooperation of the signals of functionally separated signal bands, there are produced signals which may be used for the control of the elevator plant.

In a preferred embodiment of the invention each floor-associated switching means is acted upon by the corresponding floor-bound information over a memory device and at least one output of the corresponding position of the time-depending step-by-step switching device. The outputs of these floor-associated switching means are fed to a collective switching means.

Other objects, features and advantages of the invention will become apparent from the description now to follow of preferred embodiment thereof given by way of example only and in which reference will be made to the accompanying drawings, in which FIG. 1 illustrates an elevator plant with two elevators.
FIG. 2 is a functional representation of a time-dependent step-by-step switching device.
FIG. 3 is a functional representation of a position-dependent step-by-step switching device for elevator A.
FIG. 4 is a functional representation of a position-dependent step-by-step switching device for elevator B.
FIG. 5 illustrates call bands for an elevator when all cabin calls and outer calls are present.
FIG. 6 shows call bands for an elevator when only some cabin calls and outer calls are present.
FIG. 7 shows the division of the sum band of an elevator into three sections.
FIG. 8 shows the determination of the coincidence of the time-dependent step-by-step switching device with the position-dependent step-by-step switching device of an elevator.
FIG. 9 shows the determination of the coincidence of both step-by-step switching devices under consideration of the travel direction of the time-dependent step-by-step switching device.
FIG. 10 shows the determination of the coincidence of both of these step-by-step switching devices under consideration of the travel direction of both step-by-step switching devices.
FIG. 11 shows the determination of the stop for a directional call of an elevator.
FIG. 12 shows the distribution of the outer calls onto both elevators.
FIG. 13 shows the attribution of the present outer calls to elevator A.
FIG. 14 shows the attribution of the present outer calls to elevator B.
FIG. 15 represents an elevator showing the division of its run into signal zones.
FIG. 16 shows a step limitator for the position-dependent step-by-step switching device of an elevator.
FIG. 17 shows the zone units and corresponding position and signal elements for the position-dependent step-by-step switching device.
FIG. 18 shows the step limitator and signal generator for the time-dependent, step-by-step switching device.
FIG. 19 shows zone units and corresponding position elements for the time-dependent step-by-step switching device.
FIG. 20 is a circuit diagram of the means for obtaining the cabin calls with associated call band elements of an elevator.
FIG. 21 shows a circuit diagram of the means for obtaining the outer calls "down" with associated call band elements.

FIG. 24 is a circuit diagram of the means for obtaining the sum band of an elevator.

FIG. 25 is a circuit diagram of the means for obtaining the travel direction determination of an elevator.

FIG. 28 is a circuit diagram of a time element.

FIG. 33 shows the power supply for the elevator plant, and

FIG. 34 shows the drive and the control of an elevator.

Figure 1:
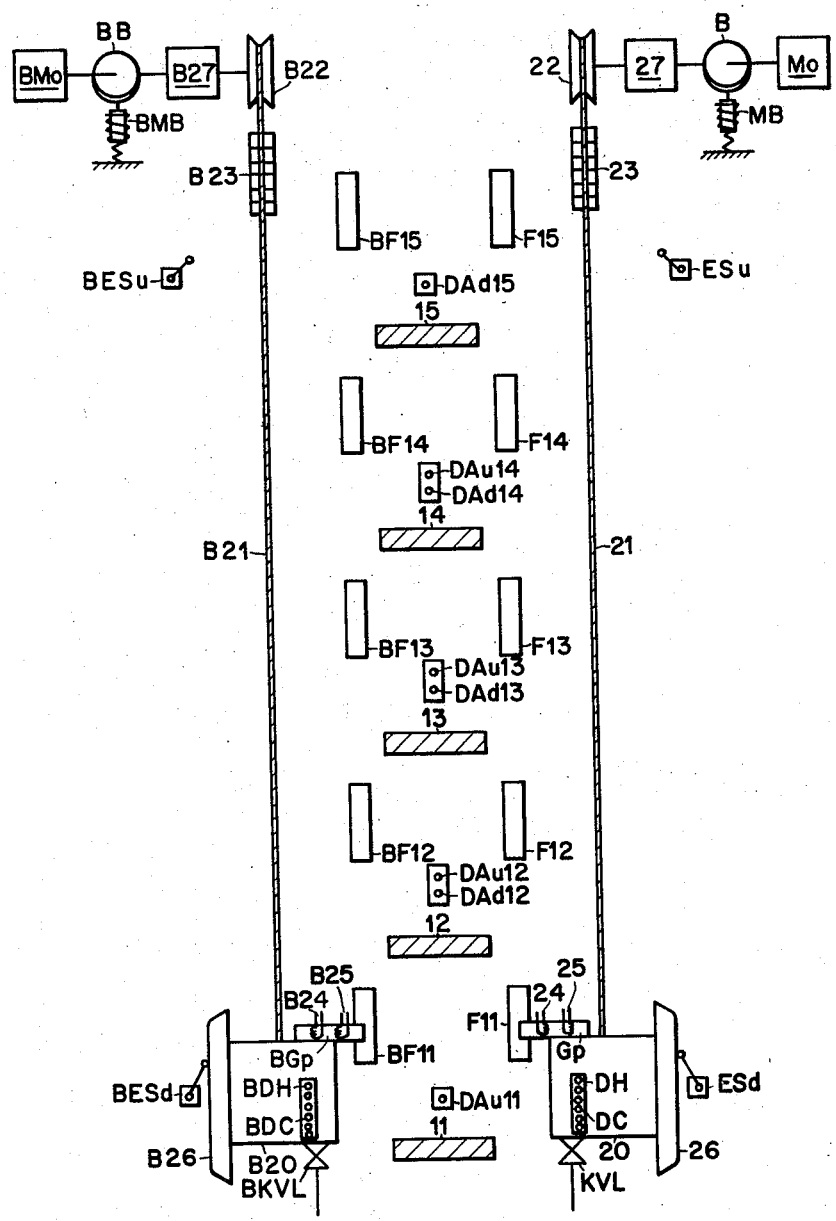

FIGURE 1.—This figure illustrates an elevator plant having two elevators attending the floors 11–15. For the following description, the ciphers 11–15 will be used for characterizing elements associated to the floors and designated by letters. Outer call buttons for upward travel DAu11 to DAu14 and outer call buttons for downward travel DAd12 to DAd15 transmit so-called "floor-bound intelligence signals" to a common control part of the two elevators consisting of the parts illustrated in FIGS. 18, 19, 21 and 22. Since generally both elevators are identical devices having functionally and constructively similar parts independent from each other, the following description shall be limited to the elevator A. The letter B shall be placed in the figures ahead of the same references for the elevator B.

Reference numeral 20 designates an elevator cabin connected by means of cables 21 and over a driving pulley 22 with a counterweight 23. The driving pulley 22 is mounted on the slowly rotating shaft of a gear 27 driven by an induction motor Mo. A brake B is mounted between the gear 27 and the motor Mo and is actuated by a magnet MB.

The cabin 20 is provided with call buttons DC which initiate floor-bound intelligence signals and further with a stop button DH. On the top of the cabin 20 there is arranged a signal generator in form of an induction switch $Gp$ having a primary winding 24 and a secondary winding 25. The primary winding 24 is supplied with A.C. voltage and produces in the secondary winding 25 over an air gap an A.C. output voltage which is transformed in a known way by a rectifier into a D.C. signal. The shaft contains sationary lugs F11–F15 which, at the passage of the cabin 20, project into the air gap of the induction switch $Gp$ and supply floor-bound signals so as to produce a position-dependent signal sequence. Further cam means 26 provided at the cabin 20 operates a pair of end switches ESd and ESu at the ends stops. If the end switch ESd or ESu respectively is operated by the cam means 26 an output signal 0 is produced at this switch. At the floor of the cabin 20 there is arranged a full load device (not represented) of known construction actuating a contact KVL when the nominal load is reached.

The control is based on a digital system working with two signal values 0 and 1. A lead has a signal 10 when there is no potential between it and a reference potential. As soon as there is a potential between this lead and the reference potential the lead will carry the signal 1.

FIGURES 2, 3 and 4.—These figures represent functional illustrations of the step-by-step switching device. The time-dependent step-by-step switching device $St$ of FIG. 2 is functionally associated with both elevators, while the position-dependent step-by-step switching device $Sp$ of FIG. 3 is associated with elevator A and the position-dependent step-by-step switching device $BSp$ of FIG. 4 is associated with elevator B. Since the elevator plant attends five floors the step-by-step switching device must have the same number of positions which are designated by references 11 to 15. Both elevators attend the floors in upward as well as in downward travel direction. Consequently also the step-by-step switching devices pass through their positions in upward direction designated with $u$ and in downward direction designated with $d$.

Figure 18:
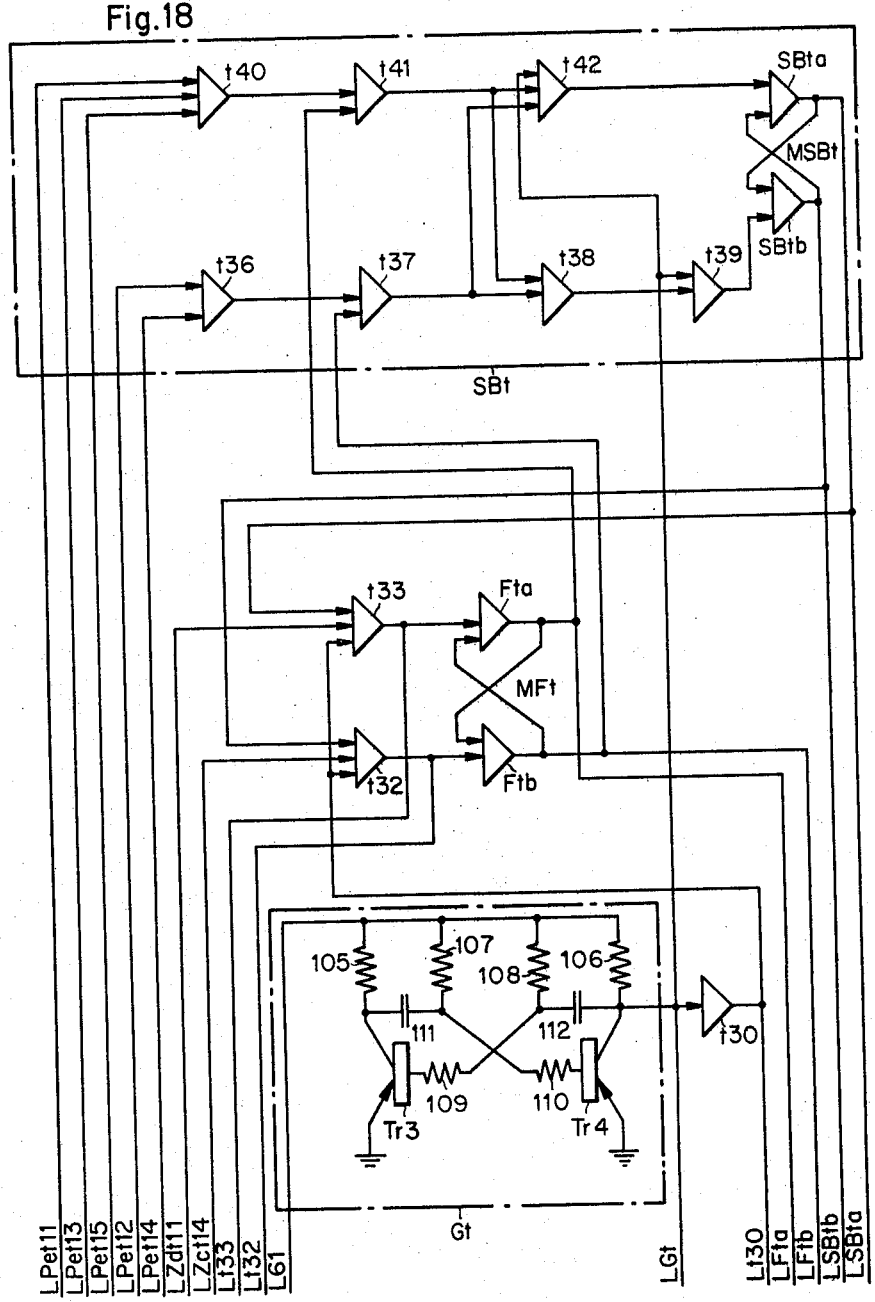

The step-by-step switching device $St$ passes under the influence of a time-dependent signal sequence produced by a generator $Gt$ according to FIG. 18 through its positions 11 to 15 in counterclockwise direction as indicated by arrows. The step-by-step switching device $Sp$ passes under the influence of the position-responsive signal sequence supplied by the induction switch signal generator $Gp$ through its positions in accordance with the order of service to the floors. The change of position of the step-by-step switching device $Sp$ therefore corresponds with the change of floor of the cabin, i.e., this change of position is effective when the cabin is in the range of a floor or when the induction switch $Gp$ leaves the gap of a lug. Consequently the representation of the step-by-step switching device $Sp$ must correspond with the column representation 101 in FIG. 3. The representation $Sp$ illustrates on a smaller scale the path to be followed by the cabin, whereby the transverse lines in this representation designate the floor levels. The arrows represent all positions of the possible runs. For example, if the cabin travels upwardly from floor 11 under the action of an outer call in floor 13 the step-by-step switching device $Sp$ passes under the influence of the lugs F11 to F13 through its positions 11 to 13 on the $u$ side. If now a cabin call is produced in floor 12 by a passenger entering the cabin in floor 13, the cabin will change its travel direction and the step-by-step switching device $Sp$ changes from the $u$ side to the $d$ side and in downward direction reaches position 12 over position 13 on the $d$ side. The position-dependent step-by-step switching device $BSp$ of elevator B would act analogously in such case.

FIGURES 5 and 6.—In order to simplify and clarify the function of the control it shall be assumed in FIGURES 5 to 11 that elevator B is out of operation so that elevator A must take over the whole traffic alone. Further it is assumed for FIG. 5 that all outer calls, as well as also the cabin calls of elevator A are actuated, as is indicated in the column representation 101 in FIG. 5, whereby symbol ○ designates an inner call, symbol ⊖ designates an outer call for upward travel and symbol ⊖ designates an outer call for downward travel.

Since a cabin call must be active independent of the travel direction of the cabin it effects its influence on the $u$-side as well as the $d$-side.

Figure 20:
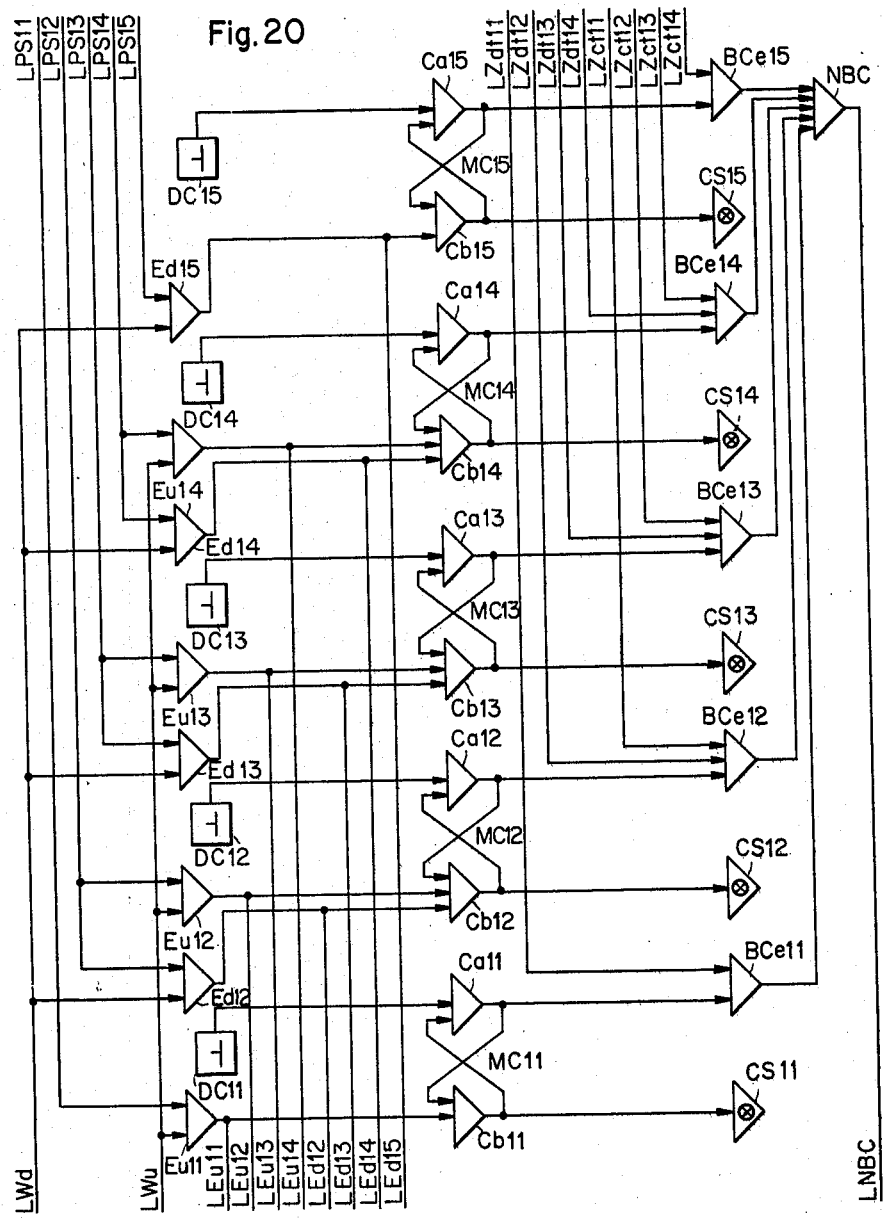
Figure 22:
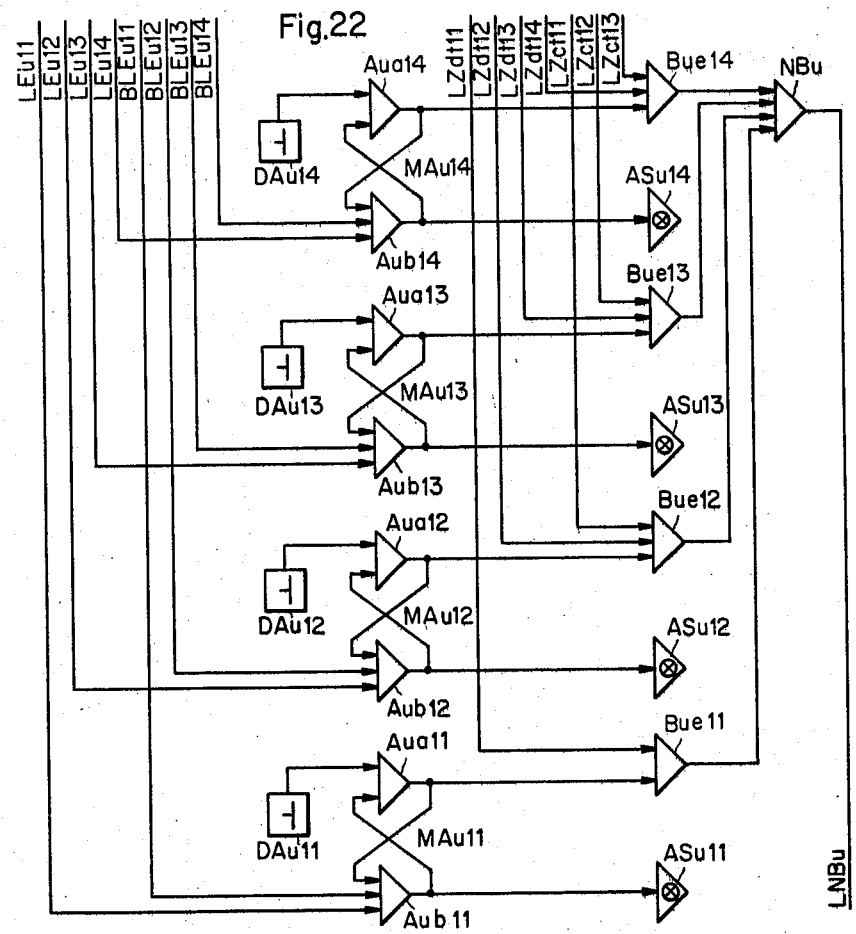
FIG. 22 is a circuit diagram of the means for obtaining the outer calls "up" with associated call band elements.

The time-dependent step-by-step switching device $St$ now scans, by switching means described with regard to FIGS. 20, 21 and 22, the calls in counterclockwise direction. From the column representation 101 in FIG. 5 and from the functional representation of the step-by-step switching device $St$ it appears that to each position of the step-by-step switching device correspond calls of the corresponding floor. If for a considered position of the step-by-step switching device $St$ there is a corresponding call, then a signal is produced. The instant at which this signal appears depends on the position of the floor designated by the call as well as on the corresponding position of the time-dependent step-by-step switching device $St$ and the duration of this signal depends on the operating speed (i.e., frequency) of the step-by-step switching device $St$. The formation in a row of these signals produced one after the other at each revolution of the step-by-step switching device $St$ forms so-called call bands, whereby a band BC is formed for cabin calls, a band $Bu$ is formed for outer calls "up" and a band B$d$ is formed for outer calls "down." Since as already described a cabin call must act in upward as well as in downward directions, such a call appears in band BC as a signal both on the $u$-side and on the $d$-side. An outer call "up" however appears as a signal only on the $u$-side of band B$u$ and an outer call "down" appears consequently as a signal only on the $d$-side of the band B$d$. For the travel all instantaneous calls must be considered. Therefore the sum of these call bands must be formed and this is effected by means of a band B$tot$.

For FIG. 6, it is assumed, as shown in the column representation 101, that in floor 12 there is an outer call "up," in floor 15 there is an outer call "down," and in floor 14 there is a cabin call. These calls appear, as represented, as signals in the bands BC, B$d$, B$u$ and B$tot$.

FIGURE 7.—In order that the calls assumed in FIG. 6 may influence the running of the cabin the position of these calls with respect to the cabin position must be determined. For FIG. 7 it is assumed, that the cabin is at floor 13. Thereby the column according to the representation 101 of FIG. 7 is divided into sections A$d$, A$k$ and A$u$. Section A$d$ comprises the calls below the cabin position asking for a downward travel of the cabin. Section A$k$ indicates the range of position of the cabin. Section A$u$ comprises the calls above the cabin position and requiring an upward travel of the cabin. Since the instantaneous calls appear as signals in the sum band B$tot$ the latter is consequently also divided into three corresponding sections.

FIGURES 8, 9 and 10.—As is visible from FIGS. 5 and 6, the sum band B$tot$ is produced by means of the time-dependent step-by-step switching device S$t$. In order to make possible division of this sum band into the mentioned three sections, the coincidence between the time-dependent step-by-step switching device S$t$ and the position-dependent step-by-step switching device S$p$ must be determined. As will appear from the following, different coincidences are required. According to FIG. 8 switching means BK$e$ (FIG. 23) determine the coincidence between position-dependent and time-dependent step-by-step switching devices irrespective of the direction of cabin travel. Since it is assumed that a cabin is in floor 13, this being indicated by hatching, each passage of the time dependent, step-by-step switching device S$t$ at the position corresponding to this floor produces a signal. Since further the position of the step-by-step switching device S$t$ is traversed twice per revolution, coincidence signals appear on both the $u$-side and on the $d$-side of the coincidence band BK.

According to FIG. 9 the coincidence between the time-dependent step-by-step switching device S$t$ taking into consideration its travel direction and between the position-dependent step-by-step switching device S$p$ is determined by the switching means BK$t$ described with regard to FIG. 25. This results in the production of coincidence bands BK$tu$ and BK$td$ in which the coincidence signal appears on the $u$-side and on the $d$-side, respectively. Since for the formation of these coincidence bands BK$tu$ and BK$td$ only the travel direction of the time-dependent step-by-step switching device S$t$ is used these coincidence bands may be designated as semi-direction-dependent coincidence bands.

According to FIG. 10 the coincidence between the time-dependent step-by-step switching device S$t$ and the position-dependent step-by-step switching device S$p$ under consideration of their corresponding travel direction is again determined by switching means BK$u$ and BK$d$ described with respect to FIG. 25. If both step-by-step switching devices S$t$ and S$p$ are in upward direction as indicated by hatching a coincidence signal appears on the $u$-side of a coincidence band BK$u$. If both step-by-step switching devices are in downward direction as shown in interrupted lines, a coincidence signal will appear on the $d$-side of a coincidence band BK$d$. Since thus for the formation of these coincidence bands BK$u$ and BK$d$ the direction of movement of both step-by-step switching devices S$t$ and S$p$ is used, these latter coincidence bands are designated as full-direction-dependent coincidence bands.

FIGURE 11.—As has already been mentioned in the preamble the cabin attends successively, all calls lying in its travel direction, i.e. all so-called directional calls. This means that the cabin must stop at the next call lying in its travel direction, this stop being determined by a stop band BH. A stop signal in the $u$-portion of the stop band BH appears when the "up" coincidence in the $u$-portion of the full-direction-dependent coincidence band BK$u$ coincides with the next adjacent call signal on the $u$-side of the collective band B$tot$. In like manner a stop signal would appear in the $d$-portion of the stop band BH as indicated in interrupted lines if the "down" coincidence in the $d$-portion of the full-direction-dependent coincidence band BK$d$ would coincide with the next call signal on the $d$-side of the band B$tot$.

As further appears from the preamble, if contra-directional calls are present the cabin shall stop at the farthest away contra-directional call. This condition is met by means (FIG. 26) to be described later on and which produce a stop signal as soon as no more call signals are present in section A$u$ and A$d$ (FIG. 7) respectively.

The discussion presented above with regard to FIGS. 5 to 11 is also applicable for elevator B if elevator A is out of operation.

Figure 12:
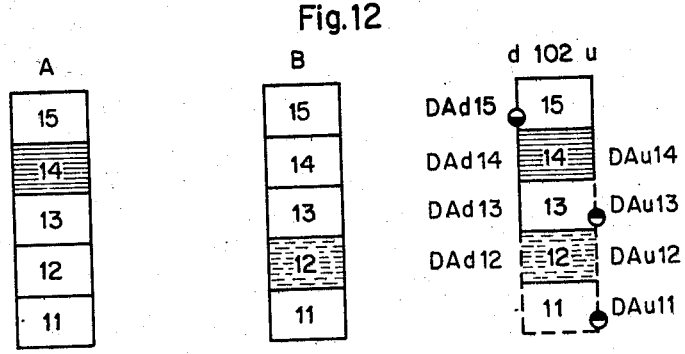
Figure 13:
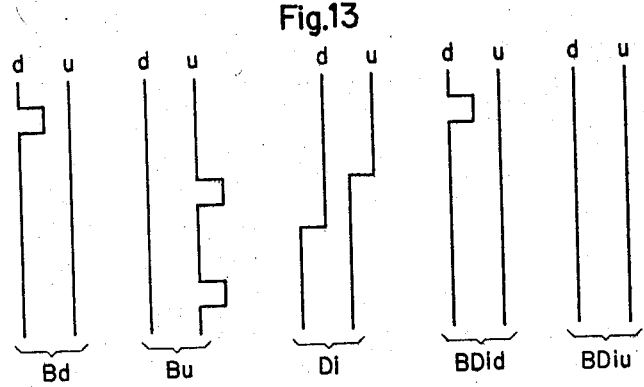
Figure 14:
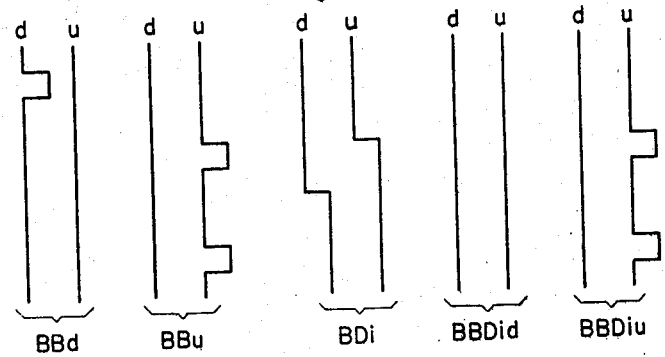

FIGURES 12, 13 and 14.—If now both elevators are in operation it is desirable in order to increase the efficiency to distribute outer calls to both elevators. The distribution to the elevators belonging to one group may be effected under different view points. In the present example the shaft with the outer calls associated to the floors is divided into two sections. The section associated to each elevator begins at the position of the one cabin and extends in counterclockwise direction to the position of the other cabin whereby the position of the cabin, in accordance to the travel direction, is on the $u$-side or on the $d$-side or in the rest position may be found on both sides. These two sections are represented in more detail in column 102 in FIG. 12. For the elevator A (column representation A) there is assumed a position in floor 14 characterized by uninterrupted hatching and for elevator B (shaft representation B) there is assumed a position in floor 12 characterized by hatching in interrupted lines. The representation of column 102 of FIG. 12 shows the outer calls common to both elevators. The assumed positions of the two cabins are also visible from the representation 102. From this representation it now appears that the section associated to the elevator A starts, on the $u$-side at floor 14 and ends on the $d$-side at floor 13, this being illustrated by a full line. This section consequently includes the outer calls DA$u$14, DA$d$15 to DA$d$13. The section associated with elevator B begins on the $d$-side at floor 12 and ends on the $u$-side at floor 13, this being is indicated by an interrupted line. This section thus includes the outer calls DA$d$12, DA$u$11 to DA$u$13. According to the representation 102 outer calls DA$u$11, DA$u$13 and DA$d$15 are present. According to the preceding explanation consequently the outer calls DA$u$11 and DA$u$13 are attended to by elevator B and the outer call DA$d$15 is attended to by the elevator A.

The realization of the distribution of the outer calls onto the two elevators shall be explained with reference to FIGS. 13 and 14. The assumed outer calls DA$u$11 and DA$u$13 appear as signals in the bands B$u$ and BB$u$ and the outer call DA$d$15 appears as signal in the bands B$d$ and BB$d$ as described with regard to FIG. 6. A distributing device described with regard to FIG. 27 divides the bands B$u$ and B$d$ as well as the bands BB$u$ and BB$d$ into two sections. This dividing device supplies signals in accordance with the afore-described conditions and these signals are supplied at the moment of coincidence between the position-dependent and the time-dependent step-bystep switching device as illustrated in the bands D$i$ and BD$i$. At each revolution of the time-dependent step-by-step switching device there is thus produced a signal on the $u$-side of band D$i$ in position 14, which signal is maintained until the step-by-step switching device has reached positon 12 on the $d$-side, and further a signal on the $d$-side of band BD$i$ in position 12, which latter signal is maintained until the step-by-step switching device has reached position 12 on the $d$-side, and further a signal on the $d$-side of band BD$i$ in position 12, which latter signal is maintained until the step-by-step switching device has reached position 14 on the $u$-side. By a cooperation of the bands B$d$ and B$u$, respectively with the band D$i$ there are produced bands BD$id$ and BD$iu$, respectively. The signals of the calls DA$u$11 and DA$u$13 are suppressed in band BD$iu$. By a similar cooperation of the bands BB$d$ and BB$u$, respectively, with the band BD$i$, there are formed bands BBD$iu$, respectively. The signal of the call DA$d$15 is suppressed in the band BBD$id$.

In FIGURES 12 to 14 the distribution of the outer calls has been described when the elevators stand still. If, however, the elevators are running the coincidence between the position-depending and the time-depending step-by-step switching device may appear according to the travel direction on the $u$-side or on the $d$-side only. Thereby a displacement of the signals in the bands D$i$ and BD$i$ may occur, resulting in a modification of the distribution of the outer calls on the two elevators.

Figure 15:
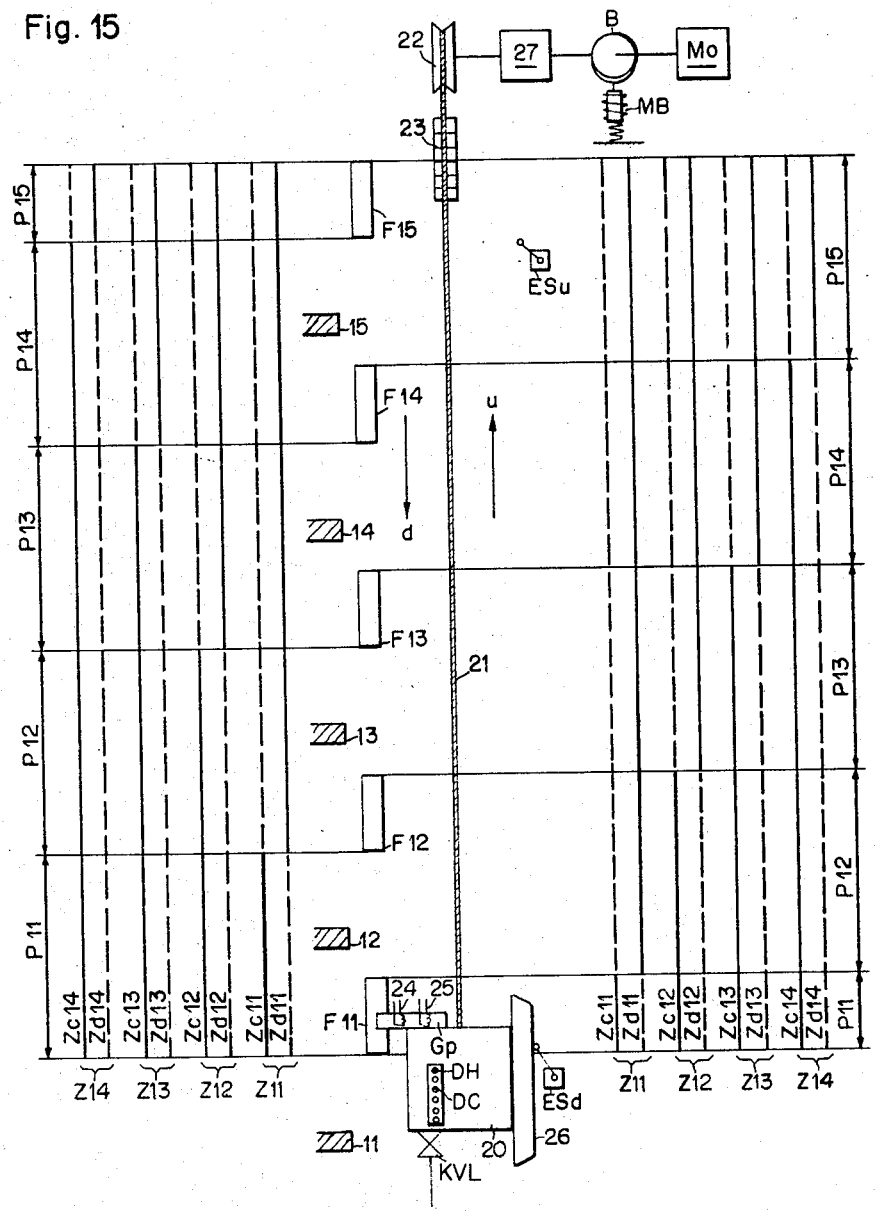

FIGURE 15.—This figure shows one of the two elevators as they have already been partly described for FIG. 1. The stroke of the cabin is divided according to $(n-1)$ ways into zones whereby $n$ designates the number of floors. To each zone there is associated a zone unit described with respect to FIG. 17 having output elements Z$c$ and Z$d$. The full line corresponds to the output value 1 and the interrupted line corresponds to an output value 0, whereby value 1 of element Z$c$ represents the distance separating the corresponding lug F from the upper end stop. When the induction switch G$p$ leaves a lug F this results in a modification of the output value of the corresponding zone unit. Thus the exit from the lug F initiates the signal change, the place of this change being not the same for the upward travel $u$ and for the downward travel $d$ as is visible from this figure. For determining the position of the cabin a so-called position element P$e$ is used which shall be described with regard to FIG. 17 and which evaluates an output value of two adjacent zone units each. These output values are represented for the distances P11 and P12 etc.

Figure 29:
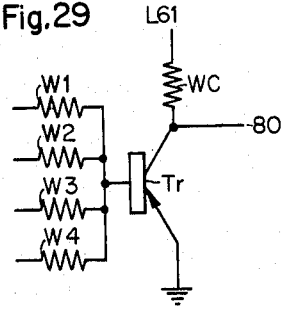
FIG. 29 illustrates a transistorized "nor" circuit.
Figure 30:
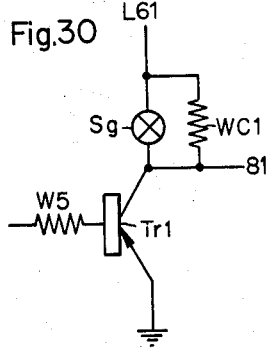
FIG. 30 shows a signal element.
Figure 31:
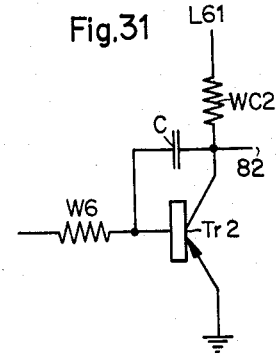
FIG. 31 shows a decelerated "nor" circuit.

The following switching diagram is based on a solid state switching means consisting at least of one "nor"-circuit. This "nor"-circuit, which will be described in detail with regard to FIGS. 29–31, issues an output signal 1 when all its input signals have the value 0 and produces an output signal 0 as soon as at least one input signal takes the value 1.

Of course this solid state switching means may consist of other logic circuits, for example, a combination of "and," "or"-"not" and memory elements, whereby this has for the elevator plant the same effect as described in the following control.

Figure 16:
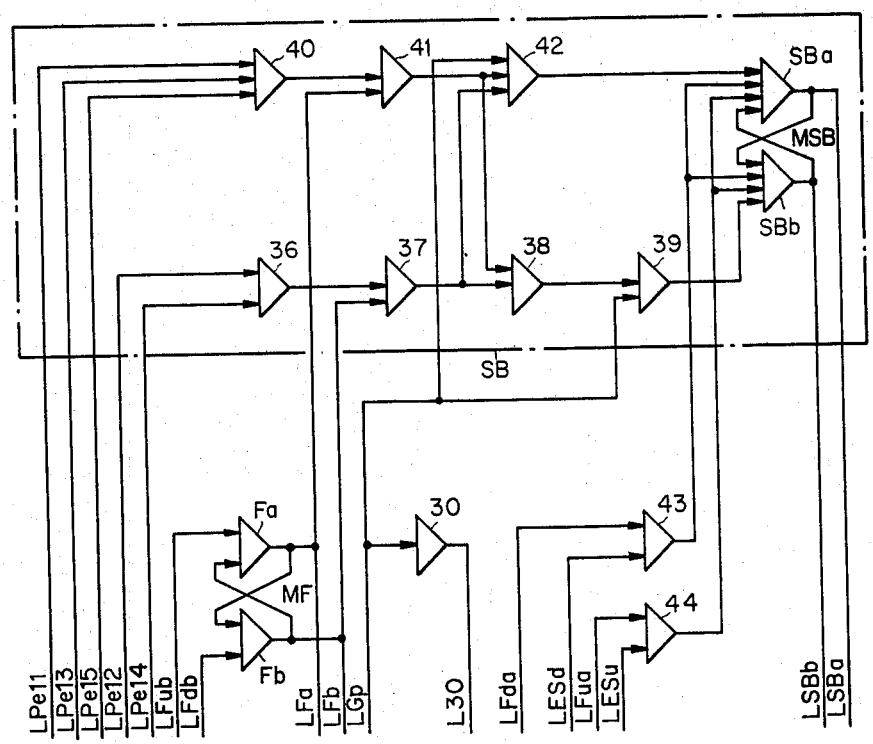
Figure 17:
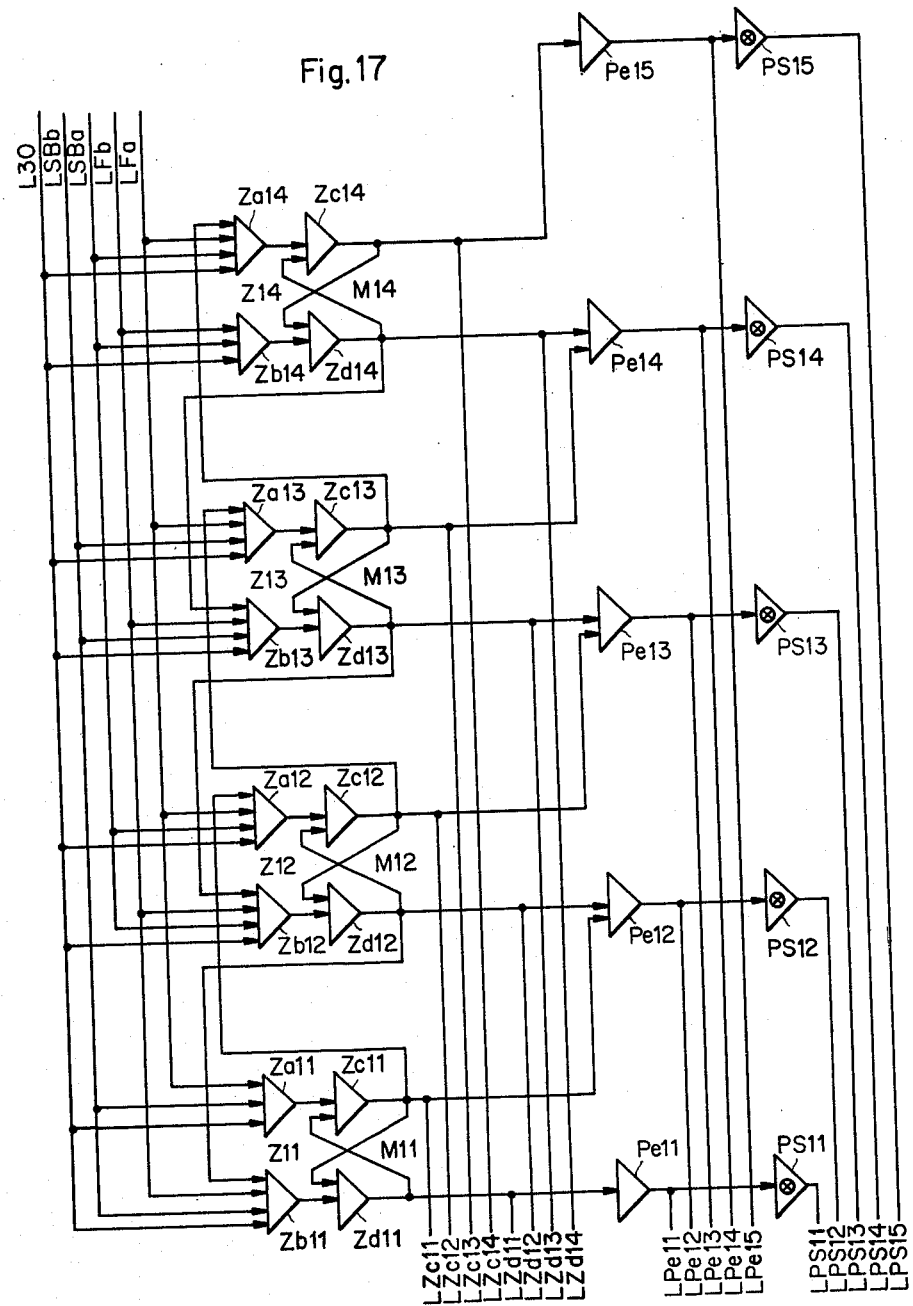

FIGURES 16 and 17.—In these two figures there is shown the diagram of the position-dependent step-by-step switching device S$p$ whereby it is assumed that the cabin is in floor 11. The lugs F (FIG. 15) are adjusted in such manner that the corresponding lug is in the air gap of the induction switch G$p$ when the cabin stops at a floor. Consequently the secondary winding 25 produces no signal, i.e. G$p$=0.

The induction switch G$p$ is connected by means of a lead LG$p$ with an element 30 the output of which is applied to a lead L30. In accordance with the direction of travel of the cabin (FIG. 25), the floor control produces signals of direction onto leads LF$ub$ for upward travelling and LF$db$ for downward travelling from elements F$ub$ and F$db$ respectively. The lead LF$ub$ leads to the first input of one element F$a$ of a memory element MF. The lead LF$db$ is connected to the first input of the other element F$b$. The output of element F$a$ serves as a second input to element F$b$ and is further connected with a lead LF$a$. The output of element F$b$ serves as a second input to element F$a$ and is further connected to a lead LF$b$.

An element 40 presents three inputs LP$e$11, LP$e$13 and LP$e$15 coming from the corresponding position elements P$e$ described in FIG. 17. The output of element 40 serves as a first input to an element 41 the second input of which is connected to lead LF$a$.

A further element 36 presents two inputs LP$e$12 and LP$e$14 again coming from corresponding position elements P$e$. The output of element 36 serves as a first input to an element 37 the second input of which leads to lead LF$b$. The output of element 37 is connected with the first inputs of elements 38 and 42. The second inputs of these elements 38 and 42 are connected with the output of element 41. The third input of element 42 is connected to the lead LG$p$. The output of element 42 supplies the first input of an element SB$a$ of a memory element MSB. The output of element 38 is connected with a first input of an element 39 and the second input thereof is connected to the lead LG$p$. The output of element 39 acts as first input of the other elements SB$b$ of the memory element MSB. The output of element SB$a$ is connected on the one hand to the second input of element SB$b$ and on the other hand to a lead LSB$a$. The output of element SB$b$ leads on the one hand to the second input of element SB$a$ and on the other hand to a lead LSB$b$. The described elements 36 to 42 as well as the memory element MSB form the so-called step limitator designated by SB in FIGURE 16.

Advantageously the step-by-step switching device S$p$ is provided with a correcting means permitting to bring it into the corresponding starting position at the end stops, should the step-by-step switching device have been disturbed by outside influences. The correcting means consists of elements 43 and 44. The output of end switch ES$d$ leads over a lead LES$d$ to the first input of element 43. A lead LF$da$ coming from an element F$da$ of a memory element MF$d$ (FIG. 25) acts as second input to element 43 the output of which serves as a third input to the elements SB$a$ and SB$b$ of the memory element MSB. The output of end switch ES$u$ leads over a lead LES$u$ to the first input of element 44. A lead LF$ua$ coming from an element F$ua$ of a memory element MF$u$ of FIG. 25 acts as a second input to the element 44 the output of which is connected as fourth input to the elements SB$a$ and SB$b$.

The diagram shown in FIG. 17 represents on the one hand $n-1$ zone units designated by Z11 to Z14 and on the other hand the position units generally designated by P and identical with the number of floors. Each zone unit Z consists of a memory element M having the corresponding elements Z$c$ and Z$d$ and correspondingly connected elements Z$a$ and Z$b$ responsive to the travelling direction. A position unit consists of the corresponding position element P$e$ and of a signal element PS.

The elements Z$a$ and Z$b$ usually comprise four inputs. The first input is connected to the lead L30. The second input of elements Z$a$ and Z$b$ which are designated with an even index of number are connected with the lead LSB$a$ and the second input of these elements Z$a$ and Z$b$ having odd index of numbers are connected with lead LSB$b$. The third input of the elements Z$a$ is connected with the lead LF$a$ and the third input of the elements Z$b$ is connected with lead LF$b$. The fourth input of the elements Z$a$ leads to the output of the corresponding elements Z$c$ having the index of numbers minus 1 and the fourth input of the elements Z$b$ leads to the output of the corresponding elements Z$d$ leads to the output of the corresponding elements Z$d$ with the index of numbers plus 1. Since no further zone unit is connected before the zone unit Z11 and since no further zone unit is connected after zone unit Z14 the fourth input is missing at element Za11 and at the element Zb14, respectively.

Within the same zone unit the elements are connected as follows: Element Zc presents two inputs. The first input is connected with the output of element Za and the second input is connected with the output of element Zd. The element Zd also presents two inputs the first of which leads to the output of element Zb and the second of which to the output of element Zc.

The position elements Pe have two inputs. The first thereof is connected with the output of the element Zd of the same index of number and the second thereof is connected with the output of the element Zc having the index of number minus 1. The outputs of the elements Zc and Zd, respectively, further lead to corresponding leads LZc and LZd, respectively. The element Pe11 has only one input since no further zone units are connected before the zone unit Z11. Also element Pe15 has only one input since there is no zone unit having the same index of number. The outputs of the elements Pe lead on the one hand to the corresponding lead LPe with the corresponding index of number and on the other hand to a corresponding signal element PS. The outputs of the signal elements PS lead to corresponding leads LPS.

Figure 19:
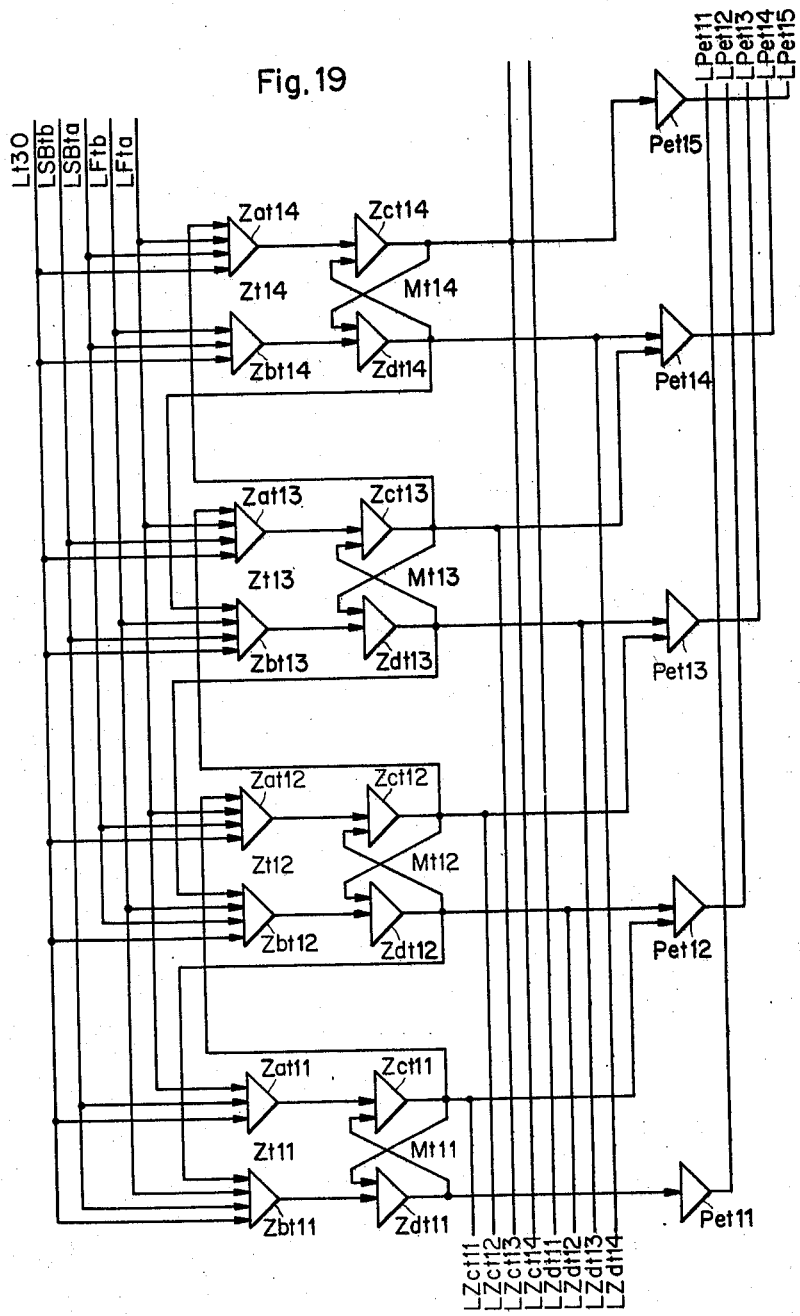

FIGURES 18 and 19.—These two figures represent the diagram of the time-dependent step-by-step switching device St. Generally this step-by-step switching device is of the same construction as the position-dependent step-by-step switching device Sp described with regard to FIGS. 16 and 17 so that it is not thought necessary to describe the same elements again. In order to avoid confusion between similar elements of the two step-by-step switching devices, the references or the indexes of the references of same elements of the time-dependent step-by-step switching device St are provided with the letter t so that for example element 40 of FIG. 16 is designated in FIG. 18 as element t40. It should be mentioned that the step-by-step switching device St of FIG. 18 differs from the device Sp of FIG. 16 by the omission of correction means 43 and 44. Consequently the elements SBta and SBtb are not provided with third and fourth inputs.

As mentioned in the description of FIG. 2 the step-by-step switching device St shall, under the influence of a time-dependent signal sequence, continuously pass through the positions 11 to 15 in upward direction and through the positions 15 to 11 in downward direction so as to produce an actual revolution in counter-clockwise direction. This signal sequence is produced by a generator Gt for rectangular pulses. The generator Gt consists of grounded emitter transistors Tr3 and Tr4. The collector of transistor Tr3 on the one hand leads over a resistance 105 to a negative lead L61 described with reference to FIG. 34 and on the other hand to one side of a condenser 111. Analogously the collector of transistor Tr4 on the one hand leads over a resistance 106 to the negative lead 161 and is connected on the other hand to the one side of a condenser 112. The base of transistor Tr3 leads over a resistance 109 and further on the one hand over a resistance 108 to a lead 161 and on the other hand also to the other side of condenser 112. The base of transistor Tr4 leads over a resistance 110 and further on the one hand over a resistance 107 to the lead L61 and on the other hand also to the other side of condenser 111. Further the collector of transistor Tr4 is connected with a lead LGt and with the input of an element t30, the output of the latter leading to a lead Lt30. The generator Gt is of known construction and produces about 400 signals per second. The lead LGt replaces lead LGp of FIG. 16.

The direction of movement in the position-dependent step-by-step switching device Sp is determined by the travel direction of the cabin. In the described time-dependent step-by-step switching device St it is the latter itself which determines its momentary direction of movement by means of the elements t32, t33 and of a memory element MFt. The elements t32 and t33 respectively, produce a signal when the time-dependent step-by-step switching device St reaches in upward travel direction the uppermost position and in downward travel direction the lowermost position respectively. The first input of element t33 is connected to lead Lt30, the second input is connected to a lead LZdt11 and the third input is connected to a lead LSbta. The output of element t33 leads on the one hand to the first input of an element Fta of the memory element MFt and on the other hand to a lead Lt33. The first input of element t32 is connected with the lead Lt30 the second input thereof is connected with a lead LZct14 and the third input thereof is connected with a lead LSBtb. The output of element t32 on the one hand leads to the first input of the other element Ftb of the memory element MFt and on the other hand to a lead Lt32. The outputs of the elements Fta and Ftb on the one hand act as reciprocal second inputs and on the other hand they act onto leads LFta and LFtb, respectively.

The difference of FIG. 19 over FIG. 17 solely consists in the omission of signal element PS and of the associated lead LPS so that it is not thought necessary to describe this figure particularly.

FIGURE 20.—This figure shows the elements associated to the cabin calls. To each floor there is associated a memory element MC consisting each of an element Ca and Cb. The first input of each element Ca is connected with the output of the corresponding push-button element DC. The latter is shown in detail in FIG. 32.

For cancelling the outer calls "up" and "down" described in FIGS. 21 and 22, travel direction responsive cancel elements Eu and Ed are required which also serve to cancel the cabin calls. Since, however, the latter are attended to in both travel directions, the outputs of both cancel elements Eu and Ed are required for cancelling the memory elements MC, exception being made for the upper and for the lower end stop which are attended in one travel direction only and which consequently require only one cancel element Ed or Eu, respectively.

For the intermediate stops the output of element Ed leads on the one hand to the first input of element Cb and on the other hand to a lead LEd. The output of element Eu is connected on the one hand with the first input of element Cb and on the other hand with a lead LEu. The outputs of the elements Ca and Cb serve as reciprocal last inputs. The output of element Ca leads to the first input of a floor associated call band element BCe and the output of the element Cb leads to a signal element CS for indicating the acceptance of the call of the corresponding cabin call. The first input of the cancel elements Eu and Ed leads to the corresponding lead LPS. The second input of the elements Eu is connected to a lead LWu. The second input of the elements Ed is connected to a lead LWd.

As mentioned in the description of FIGS. 5 and 6, the instantaneous calls shall appear as signals in the call bands, whereby to each call signal there is associated a corresponding position of the time dependent step-by-step switching device St. The production of the separate call signals in the cabin call band BC is effected through the elements BCe, the outputs of which appear as inputs in a collective element NBC. The output of the collective element NBC leads to a lead LNBC. Since a cabin call in one of the call band elements BCe shall be scanned by the corresponding position of the time-dependent step-by-step switching device St, the elements BCe11 to BCe14 have a second input constituted by a correspondent lead LZdt and the element BCe15 is provided with the lead LZct14. The third input of element BCe12 is connected with the lead LZct11, that of the element BCe13 is connected with a lead LZct12 and that of the element BCe14 is connected with the lead LZct13.

FIGURE 21.—This figure represents the elements associated to the outer calls "down" and belonging to the common control part of both elevators. To each of the floors 12 to 15 there is associated a memory element MAd consisting of elements Ada and Adb. The first input of element Ada leads to the corresponding push-button element DAd. Since an outer call "down" of each elevator of the plant may be executed in downward travel, travel direction responsive cancel signals must be able to act from each elevator onto the memory element MAd. For this reason the first input of element Adb is connected with the corresponding lead LEd and the second input thereof is connected to a corresponding lead BLEd. The outputs of the elements Ada and Adb also serve as reciprocal last inputs. The output of element Ada is connected to the first input of a floor associated call band element Bde and the output of the element Adb is connected to the input of the signal element Asd for indicating the acceptance of the call of the corresponding outer call "down."

The production of the separate call signals in the outer call band Bd is effected through the elements Bde, the outputs of which appear as inputs in a collective element NBd. Since an outer call "down" in one of the cell band elements Bde shall be scanned by the corresponding position of the time-dependent step-by-step switching device St the elements Bde12 to Bde14 have as second input corresponding leads LZdt and the element Bde15 and the lead LZct14. The third input of element Bde12 is connected with the lead LZct11 that of the element Bde13 is connected with the lead LZct12 and that of the element Bde14 is connected with the lead LZct13.

FIGURE 22.—This figure shows the elements associated to the outer calls "up" which also belong to the common control part of both elevators. To each of the stops 11 to 14 there is associated a memory element MAu consisting of elements Aua and Aub. The first input of element Aua leads to the corresponding push-button element DAu. Since an outer call "up" may be executed from each elevator of the plant in upward travel, travel direction responsive cancel signals must be able to act from each elevator onto the memory element MAu. For this reason the first input of element Aub is connected with the corresponding lead LEu and the second input is connected with the corresponding lead BLEu. The outputs of the elements Aua and Aub on the one hand serve as reciprocal last inputs. The output of element Aua serves as a first input to a floor associated call band element Bue and the output of the element Aub serves as input to a signal element ASu indicating acceptance of the corresponding outer call "up."

The production of the separate call signals in the outer call band Bu is effected by the elements Bue the outputs of which appear as inputs in a collective element NBu. The output of the collective element NBu leads to a lead LNBu. Since an outer call "up" in one of the call band elements Bue is scanned by the corresponding position of the time-dependent step-by-step switching device St the elements Bue11 to Bue14 are provided as a second input with the corresponding lead LZdt. The third input of element Bue12 is connected with the lead LZct11 that of the element Bue13 is connected with the lead LZct12 and that of the element Bue14 is connected with the lead LZct13.

Figure 23:
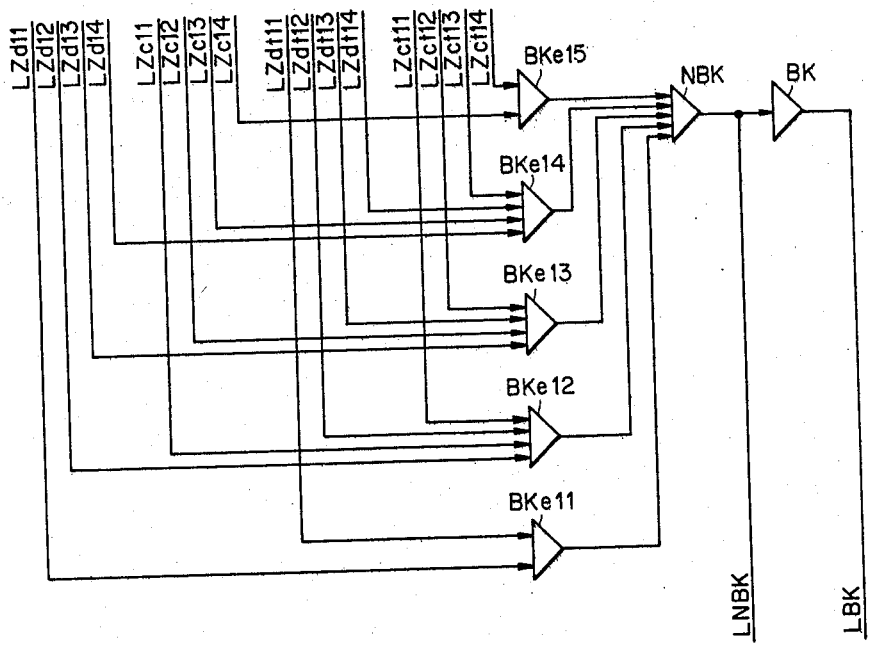
FIG. 23 is a circuit diagram of the means for obtaining the coincidence determination of the time-dependent step-by-step switching device with the position-dependent step-by-step switching device of an elevator.

FIGURE 23.—As appears from the description of FIG. 8 the coincidence between the position-dependent step-by-step switching device Sp and the time-dependent step-by-step switching device St must be determinated irrespective of the travel direction thereof. This coincidence is ascertained by comparing the positions of the two step-by-step switching devices in the floor associated elements BKe. The first input of the elements BKe11 to BKe14 is connected with the corresponding lead LZd and that of the element BKe15 is connected with the lead LZc14. The second input of element BKe11 is connected with the lead LZd11, that of the element BKe12 is connected to the lead LZc11, that of the element BKe13 is connected to the lead LZc12, that of the element BKe14 is connected to the lead LZc13 and that of the element BKe15 is connected to the lead LZct14. The third inputs of the elements BKe12 to BKe14 lead to the corresponding leads LZdt. The fourth input of element BKe12 is connected with the lead LZct11, that of the element BKe13 is connected with the lead LZct12 and that of the element BKe14 is connected with the lead LZct13. The outputs of the elements BKe serve as inputs to a collective element NBK the output of which leads on the one hand to the input of element BK and on the other hand to a lead LNBK. The output of the element BK producing the coincidence band BK is connected with a lead LBK.

FIGURE 24.—According to FIGS. 5 and 6 the calls appear as signals in the call bands BC, Bu and Bd and the sum of all these calls appears in the band Btot. The first input of an element BC leads to a lead LNBC and its second input leads to the lead LGt. The first input of an element Bu is connected with a lead LNBu, the second input is connected with the lead LGt and the third input is connected with the lead LFta. The lead LNBd is connected as first input, the lead LGt is connected as second input and the lead LFtb is connected as a third input to an element Bd.

According to the explanations given with regard to FIGS. 12 to 14 the outer calls in an elevator plant having two or more cabins, shall be distributed to the individual cabins. This is effected by a distributing device according to FIG. 27. The output signals of this distributing device make that only a certain part of the common outer calls for both elevators may become active in the sum band Btot of the corresponding elevator. The output of element Bu and of element Bd lead over elements NBDiu and NBDid, respectively to the first input of the elements BDiu and BDid, respectively. The second inputs of the elements BDiu and BDid are connected to a lead LDia and the third inputs are connected to a lead LKVL leading to a contact KVL (FIG. 1). The signals on leads LKVL result in the suppression of the signals supplied by the elements Bu and Bd when the cabin is fully occupied. The output of the elements BDiu and BDid as well as the output of the element BD lead to the element NBtot having its output connected to a lead LNBtot.

The output signals on lead LNBtot now represent the complementary value of the signal according to the band Btot of FIG. 5. This band for the sake of clarity has been selected as having the signals supplied by the element Btot indicated in interrupted lines. For the present control example, however, the element Btot, and the corresponding output lead therefrom, are not required.

FIGURE 25.—This figure includes the elements for dividing the sum band Btot into the sections Au, Ak, and Ad as mentioned with respect to FIG. 7. Moreover memory elements MFu and MFd are present which store travel direction signals determined by the elements 50 and 51. This division shall be explained as follows: First, the sum band Btot in the elements 50 and 51 is divided into two sections under the influence of the outputs of a memory element MKt storing the semidirectional coincidence signals. The first section starts, considered in counter-clockwise direction, at the point 5 (FIG. 7) and ends at the point 6. The other section starts, again considered in the same way, at point 6 and ends at point 5. Secondly, the calls present in the range of the momentary cabin position and determinating the travel direction must be suppressed, which is effected by the action of the coincidence band onto the elements 50 and 51.

The semi-directional coincidence signals explained with regard to FIG. 9 are supplied by elements BK*tu* and BK*td*. Each element BK*td* has a first input LNBK while the second input of element BK*tu* leads to lead LF*ta* and that of the element BK*td* leads to the lead LF*tb*. The output of elements BK*tu* and BK*td*, respectively, forming the semi-directional coincidence bands BK*tu* and BK*td* serve as a first input to the one element K*ta* and to the other element K*tb*, respectively, of the memory element MK*t*. The outputs of the elements K*ta* and K*tb* serve as reciprocal second inputs. Thus the output signal of the element BK*tu* remains during the passage through the positions above the cabin position of the time-dependent step-by-step switching device S*t* and the output signal of element BK*td* remains during the passage of the step-by-step switching device through the positions below of the cabin position owing to the memory element MK*t*. Further the output of elements K*ta* and K*tb*, respectively, leads to the first input of the element 50 predetermining the upward travel direction and of the element 51 predetermining the downward direction. The second inputs of these elements 50 and 51 are connected with the lead LNB*tot* and the third inputs are connected with the lead LBK. The outputs of element 50 and of element 51 are connected to the first input of the one element F*ua* of the memory element MF*u* which determines the upward travel direction and to the first input of the one element F*da* of the memory element which determines the downward travel direction on the one hand and on the other hand to a lead L50 and to a lead L51, respectively.

It is desired to cancel the travel direction of an elevator as soon as no more calls asking for this travel direction are present, this being effected by means of the elements 52 and 53. The element 52 has inputs LHG*d* and LHG*u*. Its output serves as a first input to the element 53 the second input of which leads to a lead LZE. The output of element 53 is connected to the first input of the other element F*ub* of the memory element MF*u* and to the first input of the other element F*db* of the memory element MF*d*. The outputs of the elements F*ua* and F*ub* serve as reciprocal second inputs. Further the outputs of the element F*ua* and of the element F*ub* are connected with the leads LF*ua* and LF*ub*, respectively. The outputs of the elements F*da* and F*db* serve as reciprocal second inputs. Moreover the outputs of the elements F*da* and F*db* are connected to the leads LF*da* and LF*db*, respectively. In order to prevent a simultaneous response of both travel direction a reciprocal locking is necessary. This condition is met by the last inputs of the elements 50 and F*ub* connected with the lead LF*b* as well as by the last inputs of the elements 51 and F*db* connected to the lead LF*ub*.

For influencing the travel direction switches described with reference to FIG. 34 there are provided travel direction responsive elements 54 and 55, the first input of which are connected to a lead LW*a*. The second input of element 54 leads to the lead LF*da* and its output leads to a lead L54 while the second input of element 55 is connected to a lead LF*ua* and its output is connected to a lead L55.

As appears from the description of FIGS. 10 and 11 the corresponding full directional responsive coincidence band is required for pre-determining a stop in response to a directional call and this coincidence band is formed by means of the elements BK*u* and BK*b*, respectively. The element BK*u* has a first input LNBK, a second input LF*ta* and a third input LF*db*. Its output serves as input to an element NBK*u* the output of which is connected to a lead LNBK*u*. The element BK*d* has a first input LNBK, a second input LF*tb* and a third input LF*ub*. Its output serves as input for an element NBK*d*, the output of which is connected to a lead LNBK*d*.

Figure 26:
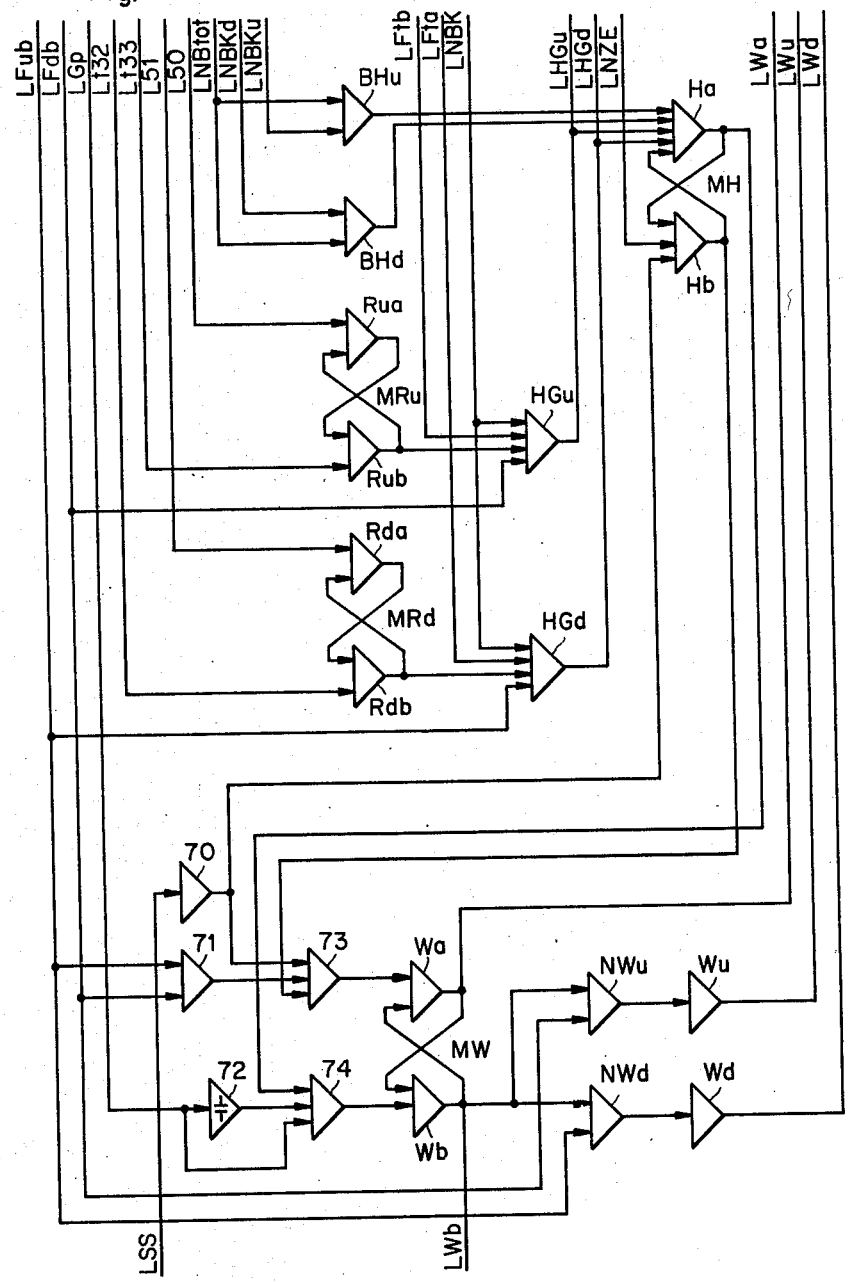
FIG. 26 is a circuit diagram of the means for obtaining the determination of the stop of an elevator.

FIGURE 26.—The device according to this figure is composed of two main parts: A first main part for predetermination of a stop and a second main part for determination of the travel duration. The first main part includes two groups of elements, a first group with the elements BH*u* and BH*d* for predetermination of the stops in response to directional calls and a second group comprising a memory element MR*u* determining the presence of a call above the cabin position with an associated element HG*u* for predetermination of a stop at the farthest counter-call with respect to the cabin position at the upward travel, i.e, at the so-called "up-counter-travel" and of a memory element MR*d* for determining the presence of a call below the cabin position with an associated element HG*d* for predetermining a stop at the farthest counter-call at the downward travel, i.e. at the so-called "down-counter travel." The stop signals supplied by these two groups are stored in a memory element MH for the stop predetermination. This signal stored as a stop order is maintained until an interruption in a safety circuit SS (FIG. 34) is produced or until the time element according to FIG. 28 becomes active.

In collective controls the selected travel direction of the cabin is maintained until all calls present for this travel direction are executed. The element HG*u* and HG*d*, respectively, give a signal only provided that no calls are present above or below of the cabin, respectively. For this reason these signals are additionally used to cancel the travel direction memory elements MF*u* (FIG. 25) and MF*d*.

The first inputs of the elements BH*u* and BH*d* are connected to a lead LNB*tot*. The second input of the elements BH*u* and BH*d*, respectively, are connected with the leads LNBK*u* and LNBK*d*, respectively. The output of the elements BH*u* for the predetermination of the stops in response to directional calls in upward travel and of the element BH*d* for the predetermination of the stops in response to the directional calls at downward travel serve as a first and as a second input, respectively, to an element H*a* of the memory element MH.

The first input of the one element R*ua* of the memory element MR*u* leads to the lead L50 and the first input of the other element R*ub* leads to the lead L*t*33. This lead supplies during the passage through the positions below the cabin position of the time-dependent step-by-step switching device S*t* a signal periodically returning into the starting position the memory element MR*u*. The outputs of the elements R*ua* and R*ub* serve as reciprocal second inputs. Further the output of element R*ub* is connected to the first input of the element HG*u*. The second input of the latter is connected with the lead LF*db*, the third input thereof with the lead LF*tb*, the fourth input thereof with the lead LNBK and its output is connected on the one hand with the third input of element H*a* and on the other hand with the lead LHG*u*.

The first input of the one element R*da* of the memory element MR*d* leads to the lead L51 and that of the other element R*db* leads to the lead L*t*32. This lead supplies during the passage above the cabin position of the time dependent step-by-step switching device S*t* a signal periodically bringing into starting position this memory element MR*d*. The outputs of the elements R*da* and R*db* serve as reciprocal second inputs. Further the output of element R*db* is connected to the input of element HG*d*. The second input of element HG*d* is connected with the lead LF*ub* the third input thereof is connected with the lead LF*ta* the fourth input thereof is connected with a lead LNBK and its output is connected on the one hand with fourth input of element H*a* on the other hand with the lead LHG*d*.

The first input on the other element H*b* of the memory element MH leads to the output of an element 70 to be described later on and the second input of the said element leads to a lead LNZE while the outputs of the elements H*a* and H*b* serve as reciprocal last inputs. Moreover the outputs of the elements H$a$ and H$b$, respectively, are connected with a first input of an element 74 to be described later on, and with the first input of an element 73, respectively.

The second main portion is formed of four parts. The first part consists of the elements 70, 73 and of an element 71 which determine whether the following conditions for initiating travel are present: Call present, stop order cancelled and safety conditions fulfilled. The second part comprises a memory element MW for storing the output signal of the first part. The third part with the element 74 and with an element 72 serves to cancel the memory element MW resulting in a travel interruption. This memory element thus determines the travel distance of the elevator. The fourth part consists of elements NW$u$, W$u$, NW$d$ and W$d$ influenced by the stop and by the travel directions and serving in turn to influence the cancel elements E$u$ and E$d$ described with reference to FIG. 20.

The element 70 has an input LSS and its output leads to a second input of element 73. The first input of element 71 is connected to lead LF$ub$, its second input is connected to lead LF$db$ and the output of this element influenced by the two travel direction signals F$ub$ and F$db$ is connected to the third input of element 73. The output of element 73 serves as first input to the one element W$a$ of the memory element MW.

The lead LG$p$ on the one hand leads to the input of element 72 and on the other hand to the second input of element 74. Since the output of element 72 (which is a decelerated "nor"-circuit according to FIG. 3) also acts onto the element 74 (third input) the cancelling signal for the memory element MW may appear only when the induction switch G$p$ enters a lug F. Consequently the output of element 74 is connected to the input of the other element W$b$ of the memory element MW. The outputs of the elements W$a$ and W$b$ serve as reciprocal inputs. Moreover, the output of element W$a$ leads additionally to the lead LW$a$ and that of element W$b$ additionally leads to the first inputs of elements NW$u$ and NW$d$ as well as also to lead LW$b$. The second input of elements NW$u$ and NW$d$, respectively, is connected with the leads LF$db$ and LF$ub$, respectively. The output of element NW$u$ serves as input to the element W$u$, the output of which is connected to the lead LW$u$. The output of element NW$d$ is connected with the input of element W$d$, the output of which is connected to a lead LW$d$.

Figure 27:
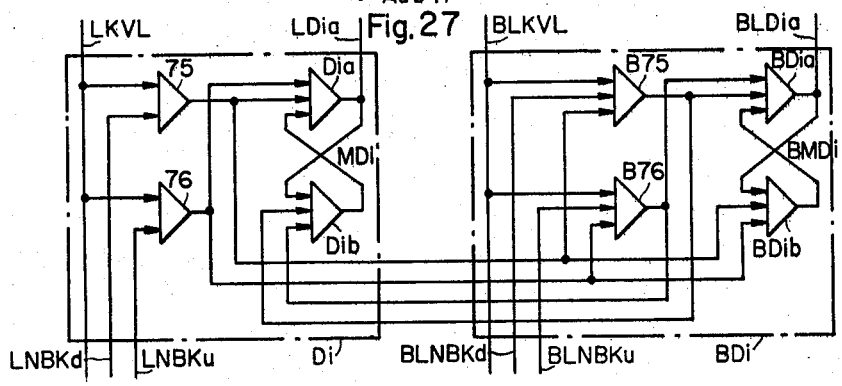
FIG. 27 is a circuit diagram of the distributor means for distributing the outer calls to both elevators.

FIGURE 27.—The division of the outer calls, as described in FIGS. 12 to 14 is effected by means of a distributing device comprising the distributor D$i$ for elevator A and the distributor BD$i$ for elevator B whereby these two distributors influence each other reciprocally. Each distributor consists of a memory element MD$i$ having connected with elements 75 and 76. These elements 75 and 76 produce an additional switching of the memory element MD$i$ of the distributor D$i$ according to the condition of operation, i.e. according to the position of the cabin, to the travel direction and to the load conditions and simultaneously a cancelling of the memory element BMD$i$ of the distributor BD$i$. Conversely elements B75 and B76 produce additional switching-in of the memory element BMD$i$ of the distributor BD$i$ and simultaneously a cancelling of the memory element MD$i$ of the distributor D$i$.

The first inputs of the elements 75 and 76 are connected to the lead LKVL. The signals from the lead LKVL to the elements 75 and 76 prevent switching-in of the distributor D$i$ when the cabin of the associated elevator is fully occupied. The second input of elements 75 and 76 leads to the lead LNBK$d$ and LNBK$u$, respectively. The outputs of the elements 75 and 76 on the one hand serve as a first and a second input to the one element D$ia$ of the memory element MD$i$ and on the other hand as a first and as a second input to the other element BD$id$ of the memory element BMD$i$. Conversely the outputs of the elements B75 and B76 on the one hand lead to the first and to the second input of the one element BD$ia$ of the memory element BMD$i$ and on the other hand to the first and to the second input of the other element D$ib$ of the memory element MD$i$. The outputs of the elements D$ia$ and D$ib$ serve as reciprocal third inputs and further the output of element D$ia$ leads to the lead LD$ia$.

If now both elevators are under the same condiitons in the same floor the elevator A shall be preferred. To this end the outputs of the elements 75 and 76, respectively, additionally lead as third inputs to the elements B75 and B76, respectively.

FIGURE 28.—In order to make possible for the passengers to enter and to leave the cabin there is provided a time-element determining the duration of stopping of the cabin when further unanswered calls are present.

The input lead LW$a$ leads over a diode 90 and over a Zener-diode 91 onto the base of a transistor T$r$5 the emitter of which is grounded. A connection point 94 of the lead connecting both diodes is connected on the one hand over a condenser C1 with a first output lead LNZE and on the other hand over a resistance 92 with the negative supply lead L61. The collector of the transistor T$r$5 leads on the one hand over a resistance 93 to the lead L61 and on the other hand to the input of an element NZE. The output of the element NZE is connected on the one hand with the input of an element ZE and on the other hand with the first output lead LNZE. The output of element ZE leads to a second output lead LZE.

Upon interruption of the travel of the elevator the storing device MW (FIG. 26) thereof, which determines the duration of the travel supplies a negative signal to the lead LW$a$. This makes effective the R–C member consisting of the resistance 92 and of the condenser C1. If the condenser is loaded to such an extent that the potential level at the connection point 94 exceeds the locking potential of the Zener-diode 91 a control current will flow through the emitter-base path of the transistor T$r$5. This makes the transistor T$r$5 conductive, its output signal changes from 1 to 0, the lead LNZE receives a signal 1 and the lead LZE a signal 0. The connection of the condenser C1 with the lead LNZE constitutes a so-called feed-back path permitting rapid change of the signal at the elements NZE and ZE.

FIGURES 29, 30 and 31.—The main part of the mentioned "nor"-circuit according to FIGURE 29 advantageously consists of a transistor T$r$. The inputs are connected with the base of this transistor over resistances, the number of which depends on the connection, for example those designated by W1, W2, W3 and W4. The emitter of this transistor is grounded while its collector leads over a resistance WC to the negative supplying line L61 of the control. Further the collector is connected with the output 80 of the "nor"-circuit.

The input resistances W of the "nor"-circuit may also be replaced by diodes whereby the latter act onto the base over an additional resistance.

The signal elements mentioned in the description are shown for example in FIG. 30. The input is connected over a resistance W5 with a base of the transistor T$r$1. Its emitter is grounded and its collector leads over a signal lamp S$g$ to the negative supply line L61. The collector is connected with the output 81. A resistance WC1 is associated with signal lamp S$g$ in order to avoid disturbances of the output effect onto the control should the signal lamp S$g$ burn out.

FIG. 31 describes the decelerated "nor"-circuit mentioned with regard to FIG. 26. The input is connected over a resistance W6 to the base of a transistor T$r$2 the emitter of which is grounded and the collector of which leads to the negative lead L61 over a resistance WC2. The collector is connected with the output 82. A condenser C is switched between the collector and the base in a such manner that due to loading of the condenser a deceleration of the output signal 82 is produced.

Figure 32:
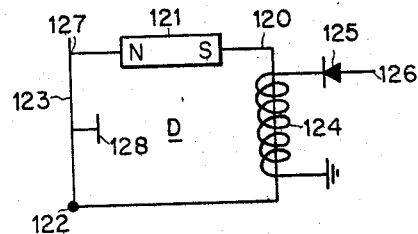
FIG. 32 shows a push-button circuit.

*FIGURE 32.*—This figure shows the diagrammatical structure of the push-button element D mentioned in the control. A permanent magnet 121 is mounted in a U-shaped iron-core 120. At one point of rotation 122 there is pivotally-connected a pole shoe 123 connecting the two legs of the iron core. The web of the U-shaped core 120 carries a winding 124 one end of which is grounded and the other end of which leads over a diode 125 to the output 126 of the push-button element D. The mentioned permanent magnet 121 produces a magnetic flux in the core 120 and thereby a forced connection of the pole shoe 123 with the core 120 at a contact point 127. If by means of the push-button 128 the pole shoe 123 is actuated a suddenly increasing air gap occurs at the contact point 127. This air gap produces in the core 120 a sudden change of the flux in turn producing a potential shot in the winding 124 appearing at the output 126 as a negative signal.

*FIGURES 33 and 34.*—The FIG. 33 illustrates the supply of an elevator plant comprising two elevators A and B which shall be illustrated in more detail in FIG. 34. Elevator A is connected over leads R1, S1, T1 and over a switch JH with power mains RST and elevator B is connected thereto over leads BR1, BS1, BT1 and over a switch BJH. A control part GCo acting onto both elevators A and B in common and consisting of the FIGURES 18, 19, 21 and 22 is supplied by leads S and T over a switch GJH, a transformer GTo, a rectifier GGL, a negative lead GL61 and a grounded lead GL60. The pulsating current appearing on the secondary side of the rectifier GGL is smoothed in a known manner.

FIG. 34 shows the drive and the control of one of the two elevators. The motor $Mo$ is supplied over the leads R1, S1, T1 and over travel direction relays $Su$ and $Sd$, respectively. The primary winding of a transformer $To$ is connected with the leads S1 and T1, while the secondary winding leads on the one hand to a rectifier G1 and on the other hand over a lead L67 to the primary winding 24 of the induction switch $Gp$ (FIG. 15). One output of the rectifier G1 is connected to a grounded lead L60 and the other output to a lead L61. Lead L60 is positive and is grounded while lead L61 is negative. The two leads L60 and L61 supply the control, $Co$ as described for FIGS. 16, 17, 20, 23–26, 28 and D$i$ (FIG. 22). The pulsating direct current on the secondary side of the rectifier G1 is smoothed in a known way. The inputs LG$p$, LES$d$, LES$u$ and LSS lead to the control $Co$. The object of the first three inputs have already been described in FIGS. 16 and 1. The lead L61 is connected to a safety circuit SS consisting of a contact K$j$ of the catching device, of a stop button DH and of door contacts K$t$ connected in series. The output of the safety circuit SS on the one hand leads over lead LSS to the control $Co$ and on the other hand over contacts KV connected in series for the locking check of the door to a lead L63. For the sake of clarity only one of the contacts KT and KV have been represented.

The control $Co$ has the three already described outputs L54, L55 and LW$b$ (FIGS. 25, 26). The output LW$b$ is connected over a resistance 64 with the base of a transistor T$r$MV. The emitter of this transistor T$r$MV is connected with the lead L60 and the collector leads over the coil of a door locking magnet MV to lead L61. The output L54 is connected with the base of a transistor T$r$S$d$ through a resistance 65. The emitter of the transistor leads over an auxiliary contact KS$u$1 of the direction switch S$u$ to the lead L60 and the collector of the same transistor is connected with the lead L63 over a relay coil S$d$.

The output L55 is connected through a resistance 66 with the base of a transistor T$r$S$u$ the emitter of which is connected over an auxiliary contact KS$d$1 with the lead L60 and the collector of which is connected over the relay coil S$u$ with the lead L62. The lead L63 is further connected over the coil of the braking magnet MS and over the auxiliary contacts KS$d$2 and KS$u$2 connected in parallel with the relays S$d$ and S$u$ with lead L60.

*Rest position of the control.*—According to FIG. 1 both elevators are at rest in floor 11. Since both elevators are identical only the conditions of elevator A will have to be described for equal control parts.

In the assumed position of the cabin the position-dependent step-by-step switching device S$p$ has the following starting position: From the description of FIG. 16 it appears that the lead LG$p$ has a signal 0 and thus that lead L30 carries a signal 1. Therefore all outputs of the elements Z$a$ and Z$b$ (FIG. 17) are 0. Since the cabin last effected a downward movement to stop 11 the elements Z$c$ have an output 1 and the elements Z$d$ have an output 0. Thus the element P$e$11 has an output 1 while the other elements P$e$ have an output 0. Thus the signal element PS11 receives an input 1 resulting in a lighting of the corresponding position lamp.

In the mentioned rest position of cabin 20 the elements of FIG. 16 show the following states: $30=1$, $$Fb=0-Fa=1$$

$$36=1-37=0-38=1-39=0$$

$$40=0-41=0-42=1-SBa=0-SBb=1$$

$$43=0$$

$$44=0$$

As appears from the description of the time-dependent step-by-step switching device S$t$ according to FIGS. 18–19, the latter, under the influence of the generator G$t$, continuously passes through its positions in upward and in downward directions. It shall now be assumed that this step-by-step switching device S$t$ has attained, in downward direction, the position 11, i.e. the so-called rest or starting position, and that generator G$t$ supplies an output signal 0. Consequently the lead LG$t$ carries a signal 0 and the lead L$t$30 carries a signal 1. Consequently also all outputs of the elements Z$at$ and Z$bt$ are 0. In the mentioned starting position the output states of the elements Z$ct$ are 1 and those of the elements Z$dt$ are 0. This results in element P$et$ 11 having an output 1 while the other elements P$et$ 12–P$et$ 15 have an output 0.

In this assumed rest or starting position of the step-by-step switching device S$t$ the elements of FIG. 18 have the following states: $t30=1-t32=0-t33=0$, F$tb$=0, F$ta$=1, $t36=1-t37=0-t38=1-t39=0$, $$t40=0-t41=0-t42=1-SBta=0-SBtb=1$$

Under the influence of a signal change from 0 to 1 in the generator G$t$ the following new output states appear:

$$t30=0-t33=1-Fta=0-Ftb=1-t41=1$$
$$-t42=1-t42=0-t38=0$$

Thus by the change of the signal of the elements F$ta$ and F$tb$ the step-by-step switching device S$t$ has automatically changed to upward direction.

The next signal change in the generator G$t$ from 1 to 0 produces the following output states:

$$t30=1-t33=0-t39=1-SBtb=0-SBta=1$$

Thereby the step limitor SB$t$ has changed its output states. The subsequent appearance of signal 1 on lead LG$t$ produces the following new output states in the step-by-step switching device S$t$: $t30=0$, $t39=0$. The leads (FIG. 19) L$t$30, LSB$tb$ and LS$ta$ carry a signal 0 and the leads LS$ta$ and LF$tb$ a signal 1.

These states result in that all inputs of the element Z$at$11 are 0 while all other elements Z$at$ and Z$bt$ at least have one input with the value 1. This results in the following new output states:

$$Zat=1-Zct11=0-Zdt11=1-Pet11=0-t40=1$$
$$-t41=0-t38=1$$

P$et$12=1—$t36$=0. Since the element P$et$12 has received the output 1 the step-by-step switching device S$t$ is in position 12. As soon as the signal carried by lead LG$t$ changes from 1 to 0, this leads to the following new output states: $t42=1$—SB$ta=0$—SB$tb=1$, $t30=1$. Therefore the output of Z$at$11 becomes 0.

Each time signal 1 appears on lead LG$t$ the output states of the elements Z$at$12, Z$at$13 and Z$at$14, respectively, are modified, resulting in a modification of the state of the elements P$et$13, P$et$14 and P$et$15, respectively, with corresponding change of position of the step-by-step switching device S$t$.

As soon as the latter has reached position 15, the signal on lead LG$t$ has changed from 1 to 0 and that on lead L$t$30 has changed from 0 to 1, the elements of the step limitor have the new output states:

$$t40=0-t41=1-t42=0$$
$$t36=1-t37=0-t39=1-\text{SB}tb=0-\text{SB}ta=1.$$

With the next change of the signal on lead LG$t$ from 0 to 1 the elements of FIG. 18 produce the following new output states:

$$t30=0-t32=1-\text{F}tb=0-\text{F}ta=1$$
$$-t41=0-t38=1-t39=0$$

Thus by changing of the output signals of the elements F$ta$ and F$tb$ the step-by-step switching device S$t$ has changed automatically to downward direction.

The next following signal change on lead LG$t$ from 1 to 0 produces the following new output states: $t30=1-t32=0$, $t42=1-\text{SB}ta=0-\text{TB}tb=1$. By the next appearance of signal 1 on lead LG$t$ the following new output states are produced: $t42=0$ and further $t30=0$. The leads L$t$30, LSB$ta$ and LF$tb$ (FIG. 19) carry a signal 0 and the leads LSB$tb$ and LF$ta$ carry a signal 1. These states result in that all inputs of the element Z$bt$14 become 0 while all remaining elements Z$at$ and Z$bt$ have at least one input with the signal 1. This results in the following new output states:

$$\text{Z}bt14=1-\text{Z}dt14=0-\text{Z}ct14=1-\text{P}et15=0-t40=1$$

P$e$14$=1-t36=0-t37=1-t38=0$. Since element P$et$14 has output 1, the step-by-step switching device is in position 14.

At the next signal change from 1 to 0 on lead LG$t$ the following new output states are produced:

$$t39=1-\text{SB}tb=0-\text{SB}ta=1$$

$t30=1$. Thus Z$bt$14 becomes 0.

Each time signal 1 appears on lead LG$t$ the output state of the elements Z$bt$13, Z$bt$12, Z$bt$11, respectively, changes resulting in a change of the state of the elements P$et$13, P$et$12, P$et$11, respectively, with corresponding change of the position of the step-by-step switching device S$t$.

As soon now, as the step-by-step switching device S$t$ has reached position 11, the signal on lead LG$t$ has changed from 1 to 0, the signal on lead L$t$30 has changed from 0 to 1, all elements of FIGURES 18 and 19 have the starting states for the assumed starting position of the step-by-step switching device S$t$, i.e. the step-by-step switching device has terminated a scanning cycle.

As it has been assumed that the elevator plant is in rest position there are no calls present so that the memory elements MC (FIG. 20) MA$d$ (FIG. 21) and MA$u$ (FIG. 22) associated to the push-button elements are cancelled. This results in all elements C$a$, A$da$ and A$ua$ having the output state 1 while all elements C$b$, A$db$ and A$ub$ have the output state 0. Consequently each of the call band elements DC$d$, B$de$ and B$ue$ has at least one input with the state 1 so that all their outputs are 0. It results therefrom that each of the elements B$c$, B$u$, B$d$ and B$tot$ (FIG. 24) forming the call bands have a continuous signal 0.

As results from the description of FIG. 23 the floor associated elements BK$e$ serve to determine the coincidence between the step-by-step switching devices S$p$ and S$t$. Since in the assumed rest position of the cabin 20 in floor 11 the leads LZ$c$ and LZ$d$ coming from the step-by-step switching device S$p$ carry a signal 1 and a signal 0, respectively, the elements BK$e$12 to BK$e$15, independently of the signal value on the leads LZ$ct$ and LZ$dt$ coming from the step-by-step switching device S$t$ have the output state 0. At the moment of identity of position of both step-by-step switching devices S$p$ and S$t$, which identity in the assumed case occurs in position 11, the inputs LZ$d$11 and LZ$dt$11 of element BK$e$11 are 0 and the output thereof is 1. Thus the element BK forming the coincidence band produces, as long as the step-by-step switching device S$t$ is in position 11 a signal 1. This signal appears in position 11 with each revolution of the step-by-step switching device S$t$ on the $u$-side and the $d$-side until the cabin leaves the range of floor 11.

Simultaneously with the coincidence signal 1 appearing on lead LBK a signal 0 appears on lead LNBK which represents the complementary value to this coincidence signal. This signal 0 produces with the signal 0 appearing on lead LF$ta$ at upward direction of the step-by-step switching device S$t$ an output signal 1 at element BK$tu$ resulting in an output signal 0 at element K$ta$ and in an output signal 1 at element K$tb$. At downward direction of the step-by-step switching device S$t$ the lead LF$tb$ carries a signal 0. As soon as signal 0 on the lead LNBK appears again the element BK$td$ supplies an output signal 1 resulting in a change of the output signals at the elements K$ta$ and K$tb$. Since no calls are present lead NLB$tot$ produces a continuous signal 1 so that the elements 50 and 51 predetermining the travel direction have an output 0.

Since no calls are present, the leads LHG$u$ and LHG$d$ coming from the elements HG$u$ and HG$d$ (FIG. 26) carry a signal 1 producing at element 52 an output state 0. The lead LZE coming from the time element (FIG. 28) carries in the rest position of the cabin a signal 0 so that the output of element 53 supplies cancelling signals 1 to the memory elements MF$u$ and MF$d$.

*Travel examples with elevator A.*—As has already been described, the cabin is in floor 11. It is assumed that in floor 12 the outer push-button "up" (DA$u$12) and in floor 15 the outer push-button "down" (DA$d$15) are operated. The signal 1 produced by the actuation of the push-button elements DA$u$12 and DA$d$15, respectively is stored in the memory elements MA$u$12 (FIG. 22) and MA$d$15 (FIG. 21), respectively. This results in a signal 0 at the outputs of the elements A$ua$12 and A$da$15 as also in a signal 1 at the outputs of the elements A$ub$12 and A$db$15. The signal 1 of the elements A$ub$12 and A$db$15 supplies the signal elements AS$u$12 and AS$d$15, respectively, whereby the acceptance of the call is acknowledged by the lighting of the corresponding signal lamp. The output 0 of element A$ua$12 produces with the signals 0 appearing in position 12 of the step-by-step switching device S$t$ in the leads LZ$dt$12 and LZ$ct$11 an output 1 at element B$ue$12. This output signal 1 produces a signal 0 in the lead LNB$u$ and consequently at the corresponding input of the element B$u$ (FIG. 24) forming the call band. A signal 1 appears at the output of this element B$u$ as soon as the inputs LF$ta$ and LG$t$ are 0. As it is assumed that only elevator A is in operation the lead LD$ia$ coming from the distributing device D$i$ (FIG. 27) has a signal 0 so that a signal 1 appears at the output of element BD$iu$ at the same time as at the output of element B$u$.

The output 0 of element A$da$15 (FIG. 21) produces with the signal 0 appearing in lead LZ$ct$14 when the step-by-step switching device S$t$ is in position 15 an output 1 at element B$de$15. This output signal 1 produces a signal 0 in the lead LNB$d$ and consequently at the corresponding input of the element B$d$ (FIG. 24) forming the call band. At the output of this element B$d$ there is produced a signal 1 as soon as also the inputs LF$tb$ and LG$t$ are 0. Since the lead LD$ia$ carries a signal 0, a signal 1 appears at the output of element BD$id$ simultaneously as at the output of element B$d$. The outputs 1 of the elements BD$iu$ and BD*id* now produce in band B*tot* a signal 1 on the *u*-side in position 12 and a signal 1 on the *d*-side in position 15.

As soon as the step-by-step switching device S*t* has reached position 12 on the *u*-side a signal 1 appears in the band B*tot* and a signal 0 on the lead LNB*tot*. In this position the output of element K*ta* carries a signal 0 and that of the element K*tb* a signal 1 so that all inputs of the element 50 predetermining the upward travel direction are 0, resulting in the production of an output 1 at the element 50. This output 1 produces at element F*ua* an output 0 and at element F*ub* an output signal 1.

This signal 1, also appearing in lead LF*ub*, on the one hand results in a locking of the elements 51 and F*db* associated to the other travel direction and on the other hand in an output 0 at element 71 (FIG. 26). Since the safety circuit SS (FIG. 34) produces a signal 1 element 70 receives an output 0. As will appear from the following the lead LNZE (FIG. 26) carries a signal 1 when the cabin is at rest, so that the output of the element H*b* carries a signal 0. Consequently all inputs of element 73 are 0 and its output is 1. This results in an output 0 at the element W*a* of the memory element MW determining the travel distance and in an output 1 at element W*b*.

In the rest position of the cabin and previous to the element W*a* taking the state 0 the time element according to FIG. 28 has the following basic state: Lead LWA=1. The condenser C1 is loaded and a control current is produced for tansistor T*r*5. Through this its output is 0 resulting for the element NZE in an output 1 and for the element ZE in an output 0. With the change of the signal in the lead LW*a* from 1 to 0, the condenser is discharged over diode 90 resulting in the potential at point 94 decreasing to the value 0. This leads to the following new output states: T*r*5=1—NZE=0—ZE=1.

With the change of the signal in lead LW*a* from 1 to 0 the other input of element 55 (FIG. 25) becomes 0 and its output carries a signal 1 which operates transistor T*r*S*u* (FIG. 34) over the lead L55. Simultaneously the signal 1 in lead LW*b* renders conductive transistor T*r*MV so that the locking magnet MV is energized, the door in floor 11 is locked and thereby closes the open contact KV of this door. Thus the relay S*u* is energized over lead L63 and is closed. With the relay S*u* is also closed its auxiliary contact KS*u*2 so that the braking coil MB is energized, the brake B is released and the motor M*o* starts the cabin to an upward travel.

With the appearance of the signal 1 on the lead LF*ub* the step-by-step switching device S*p* (FIGS. 16, 17) is brought to upward direction travel by the following new output states F*a*=0—F*b*=1, 41=1—42=0, 38=0—39=1

Thereby SB*b*=0—SB*a*=1 so that lead LSB*b* carries a signal 0 and lead LSB*a* a signal 1.

Owing to the upward moving of the cabin the induction switch G*p* comes out of the action of the lug F11 so that the lead LG*p* is supplied with a signal 1. This results in the following new output states: 39=0, 30=0. The leads L30, LSB*b* and LF*a* all carry a signal 0 and the leads LSB*a* and LF*b* a signal 1. These states result in that all inputs of the element Z*a*11 are 0 while all other elements Z*a* and Z*b* at least have one input with the value 1. This results in the following new output states: Z*a*11=1—Z*c*11 =0—Z*d*11=1—P*e*11=0—40=1—41=0—38=1, P*e*12 =1—36=0. Since the element P*e*12 has received the output 1 the step-by-step switching device S*p* is in position 12.

The call in floor 12 is a directional call requiring a stop of the cabin in this floor. With the change of the step-by-step switching device S*p* from position 11 to position 12 the lead LZ*c*11 (FIG. 23) receives a signal 0 and the lead LZ*d*11 receives a signal 1. Thus the coincidence signal at coincident position of both step-by-step switching devices can no longer be supplied by element BK*e*11 but only by the element BK*e*12 so that the coincidence signal appears in the band BK in position 12. In order to predetermine a stop for a directional call the full direction-dependent coincidence signal is required. Owing to the upward travel of the cabin the lead LF*db* carries a signal 0. The coincidence signal 1 at element BK*u* (FIG. 25) appears only when also the step-by-step switching device S*t* is in upward direction, i.e. when the lead LF*ta* carries a signal 0 and a signal 0 appears in the lead LNBK, conditions which are not fulfilled at that moment.

As now in position 12 of the coincidence band BK*u* and of the sum band B*tot* a signal 1 appears simultaneously, the leads LNB*tot* and LNBK*u* carry a signal 0 resulting in the output of element BH*u* (FIG. 26) carrying the value 1. The latter signal produces an output 0 at element H*a* and an output 1 at element H*b*. Thereby a stop signal is stored in the memory element MH predetermining the stop.

As soon as the induction switch G*p* attains the zone of the lug F12 the signal in lead LG*p* leading to element 72 (FIG. 26) changes from 1 to 0. Since, however, this element 72 supplies a decelerated output 1 all inputs of element 74 are 0 for a short period so that its output cancels the memory element MW. The signal change thereby occurring in lead LW*a* from 0 to 1 produces an output 0 at element 55 so that the transistor T*r*S*u* (FIG. 34) is cut-off and the relay S*u* is released. Thereby the auxiliary contact KS*u*2 is opened, the brake B is initiated and the cabin stops. The signal change on lead LW*b* produces on the one hand the release of the locking magnet MV resulting in the unlocking of the door in floor 12 and in the opening of the corresponding contact KV and on the other hand in an output signal 1 at element NW*u* (FIG. 26). The signal 0 thereby produced in lead LW*u* produces with the signal 0 in lead LPS12 an output signal 1 at the cancel element E*u*12 (FIG. 20). This cancel signal guided over the lead LE*u*12 results in a cancelling of the memory element MA*u*12 (FIG. 22). Thus no further signal 1 appears in band B*tot* in position 12.

The signal change in lead LG*p* from 1 to 0 results in the following new states in the step-by-step switching device S*p* (FIGS. 16, 17): 42=1—SB*a*=0—SB*b*=1, 30=1. Consequently the output of element Z*a*11 becomes 0.

The mentioned signal change from 0 to 1 on lead LW*a* further results in a recharging of condenser C1 (FIG. 28) of the time element over resistance 92. However, the outputs LNZE and LZE change only when the condenser C1 is charged so that the cabin remains in stop position in spite of the call present at floor 15.

It shall now be assumed that a passenger enters the cabin in floor 12 and actuates the push-button DC14. The opening of the door in floor 12 by this passenger opens the door contact KT so that the signal on lead LSS becomes 0. It results therefrom at the output of element 70 (FIG. 26) a signal 1 which on the one hand cancels the memory element MH and on the other hand prevents actuation of the memory element MW. As soon as the door is closed again the signal on lead LSS changes from 0 to 1, so that the travel may start again in the manner described for the call of the first travel example.

The signal 1 produced by the actuation of push-button DC14 is stored in the storing element MC14 (FIG. 20). Thereby a signal 1 is produced over the element BD*e*14, NBC, BC and NB*tot* in the band B*tot* in position 14. As this is a cabin call and since element BC has no input depending on the travel direction of the step-by-step switching device S*t* this signal appears both on the *u*-side and on the *d*-side of the band B*tot*.

As the travel continues the induction switch G*p* leaves the zone of effect of lug F12 whereby the signal change from 0 to 1 on lead LG*p* produces a change of state of the elements Z*a*12, Z*c*12, Z*d*12, P*e*12 and P*e*13 in a manner similar to that described for the first travel example for the leaving of the induction switch G*p* from the range of influence of the lug F11. These changes of state have brought the step-by-step switching device S*p* from position 12 to position 13. As the induction switch Gp leaves the lug F13 the next change of position from 13 to 14 occurs.

By the mentioned change to position 14 of the step-by-step switching device Sp, the lead LZc13 (FIG. 23) receives a signal 0 and the lead LZd13 receives a signal 1. Thus the coincidence signal at coincident position of both step-by-step switching devices Sp and St is supplied by the element BKe14 so that the coincidence signal appears in band BK in position 14. Thereby the stop signal is predetermined by the element BHu (FIG. 26) and stored in the memory element MH so that the cabin is brought to stop in floor 14 as has been previously described for the stopping at floor 12.

As the passenger leaves the cabin in floor 14 the corresponding door contact is actuated resulting in the initiation of the next travel due to the call stored in floor 15. Thereby the step-by-step switching device Sp changes from position 14 to position 15 and the coincidence signal in band BK appears in position 15. Thereby this coincidence signal appears simultaneously with the call signal in position 15 resulting in that the element 50 (FIG. 25) supplies a continuous signal 0 via lead L50. At the change of the direction of the step-by-step switching device Sp in position 11 the lead Lt33 (FIG. 26) receives a signal 1 resulting in the element Rub of the memory element MRu supplying a signal 0 and the element Rua supplying a signal 1. Owing to the continuous signal 0 in lead L50 the outputs of this memory element MRu remain unchanged so that the element HGu produces a signal 1 at the appearance of the coincidence signal on the d-side. This signal is stored in the memory element MH and initiates the braking as soon as the induction switch Gp reaches the zone of the lug F15.

As soon as the cam 26 actuates the end switch ESu (FIG. 1) a signal 0 is produced in lead LESu (FIG. 16). This results in an output 1 for the element 44 and therefore in an output 0 for the elements SBa and SBb each. This further results in all inputs of the elements Za becoming 0 so that all zone units Z of the step-by-step switching device Sp are brought into the initial position for downward travelling provided that this had not already happened by the normal control sequence in this step-by-step switching device.

It is now assumed that the passenger entering in floor 15 actuates the push-button DC11. The output signal 1 thereby appearing at this push-button element is stored in the memory element MC11 and a signal 1 is produced in position 11 both on the u-side and on the d-side of band Btot.

The signal change from 0 to 1 produced in lead LWa (FIG. 28) by the stop in floor 15 leads to a charging of the condenser C1 over the resistance 92. As soon as the condenser C1 is charged the transistor Tr5 becomes conductive resulting in the production of a signal 1 in lead LNZE and of a signal 0 in lead LZE. Since the element HGu (FIG. 26) predetermining the stop supplies a signal 1 at each revolution of the step-by-step switching device St a signal 0 appears simultaneously at element 52 (FIG. 25). Thus both inputs of element 53 are 0 and its output supplies a signal 1 cancelling the memory element MFu. The signal change from 0 to 1 thereby produced in lead LFua results in an output signal 0 at element 44 (FIG. 16). At this moment the elements of the step limitator SB show the following output states: 40=0—41=1—42=0, 36=1—37=0—38=0—39=1—SBb=0—SBa=1.

By the mentioned cancelling of the memory element MFu the signal in lead LFub changes from 1 to 0. This results in the memory element MAd15 (FIG. 21) receiving over the elements MWd, Wd (FIG. 26), Ed15 (FIG. 20) a cancelling signal as receives also the lead LEd15.

As mentioned above a signal 1 appears in position 11 in the band Btot. Further in this position the output of the element Kta (FIG. 25) carries a signal 1 and the output of element Ktb carries a signal 0 so that all inputs of element 51 predetermining the downward travel direction are 0 and that the output of the last mentioned element is 1. This in turn produces at element Fba an output 0 and at element Fdb an output 1.

The signal 1 appearing in lead LFdb produces on the one hand a locking of the elements 50 and Fub associated to the other travel direction and on the other hand an output 0 at element 71 (FIG. 26). As soon as the door in floor 15 is closed, the safety circuit SS (FIG. 34) produces a signal 1 and the element 70 (FIG. 26) receives an output 0. Since also the output of element Hb carries a signal 0 all inputs of the element 73 are 0 and its output is 1. This in turn produces at element Wa an output 0 and at element Wb an output 1.

With the change of the signal from 1 to 0 in the lead LWa the condenser C1 (FIG. 28) is discharged over the diode 90. This results in the following new output states of the time element: Tr5=1—NZe=0—ZE=1.

With this change of the signal in lead LWa the other input of element 54 (FIG. 25) becomes 0 and its output carries a signal 1 which activates the transistor TrSd (FIG. 34) over the lead L54. Simultaneously the signal 1 in lead LWb renders conductive the transistor TrMV so that the locking magnet MV is energized, the door in floor 15 is locked and the open contact KV of this door is closed. Thereby the relay Sd is energized over lead L63 so that it is closed. Together therewith auxiliary contact KSd2 is also closed so that the braking coil MB is energized, the brake B is released and the motor Mo may start the cabin for a downward travel.

With the appearance of signal 1 on lead LFdb the step-by-step switching device Sp (FIGS. 16, 17) is changed to downward travel direction by the following changes of state: Fb=0—Fa=1, 41=0—38=1—39=0, 42=1—SBa=0—SBb=1, so that lead LSBb carries a signal 1 and lead LSBa carries a signal 0.

By the downward movement of the cabin the induction switch Gp leaves the zone of the lug F15 so that the lead LSp is supplied with a signal 1. This results in the following new output states: 42=0 and further 30=0. The leads L30, LSBAa and LFb carry a signal 0 and the leads L3Bb and LFa a signal 1. These states result in all inputs of the element Zb14 being 0, while all other elements Za and Zb have at least one input with the value 1. This results in the following new output states: Zb14=1—Zd14=0—Zc14=1—Pe15=0—40=1, Pe14=1—36=0—37=1—38=0. Since the element Pe14 has received the output the step-by-step switching device is in position 14.

As soon as the induction switch Gp reaches the lug F14 the signal in lead LGp changes from 1 to 0. This results in the following new output states: 39=1—SBb=0—SBa=1, 30=1. Thus Zb14 becomes 0.

Upon further travelling of the cabin the output states of the elements Zb13, Zb12 and Zb11, respectively, are modified analogously when the induction switch Gp leaves the lugs F14, F13 and F12, respectively, resulting in a modification of the state of the elements Pe13, Pe12 and Pe11, respectively, with corresponding change of the position of the step-by-step switching device Sp.

For predetermining the stop in floor 11 the full direction-dependent coincidence signal is required. Owing to the downward travel of the cabin the lead LFub carries a signal 0. The coincidence signal 1 at element BKd (FIG. 25) appears only when the step-by-step switching device St is in downward direction and thus when the lead LFtb carries a signal 0 and when a signal 0 appears on the lead LNBK. These are conditions which are not fulfilled at that moment.

Since in position 11 of the coincidence band BKd and of the sum band Btot a signal 1 appears simultaneously the leads LNBtot and LNBKd carry a signal 0 so that the output of the element BHd (FIG. 26) has the value 1. This output signal is stored in the memory element MH and leads to the stopping of the cabin in the manner described for the stop in floor 12.

As soon as the cam 26 actuates the end switch ESd (FIG. 1) a signal 0 is produced in lead LESd (FIG. 16). This results in an output 1 for the element 43 and therefor in an output 0 for the elements SBa and SBb each. This further results in all inputs of the elements Zb becoming 0 so that all zone units Z of the step-by-step switching device Sp are brought into the initial position for upward travelling, provided that this had not already happened by the normal control sequence in this step-by-step switching device.

As the position 11 of the step-by-step switching device Sp is reached, no more signals 1 appear below the cabin so that the element HGd (FIG. 26) supplies a position 1 at each revolution of the step-by-step switching device St. After the end of the period of the time element (FIG. 28) the lead LZE carries a signal 0. Since also element 52 (FIG. 25) supplies an output signal 0 at the moment of the appearance of the signal 1 in lead LHGd a signal 1 appears at the output of element 53 resulting in a cancelling of the memory element MFd. The signal change produced thereby in lead LFda from 0 to 1 produces an output signal 0 at element 43 (FIG. 16). At this moment the elements of the step limitator SB have the following output states: $26=1-37=0-38=1=0$, $40=0-41=0-42=1-SBa=0-SBb=1$, so that the control is in the same position as have been described in the section "Rest position of the control."

*Travel examples with the elevators A and B.*—For these travel examples it is assumed that the conditions are the same as for FIGURE 12, i.e., that cabin A is in floor 14, that cabin B is in floor 12, that outer calls "up" are present in the floors 11 and 13 and that an outer call "down" is present in floor 15. The outer calls DAu11 and DAu13 appear as signals in the bands Bu, BBu, while the outer call DAd15 appears as a signal in the bands Bd and BBd.

According to the representation 102 of FIG. 12 two sections are provided to which are associated a number of outer calls. The formation of these sections is effected by the dividers Di (FIG. 27) and BDi. In the rest position of the elevator plant and with the assumed positions of the cabins but without calls, the sections are produced as follows. In position 14 of the step-by-step switching device St a signal 1 appears in each of the full direction-dependent coincidence bands BKu and BKd of elevator A. The signal 0 produced in lead LNBKu by the upward direction of the step-by-step switching device St leads in this position 14 to an output 1 at element 76 resulting in the following output states of the memory elements MDi and BMDi. $Dia=0-Dib=1$, $BDib=0-BDia=1$. Consequently the lead LDia carries a signal 0 and the leads BLDia carries a signal 1. The signal 0 produced in the lead LNBKd in downward position of the step-by-step switching device St produces in position 14 an output 1 at element 75 this having no influence onto the memory element MDi and BMDi. In position 12 of the step-by-step switching device St a signal 1 appears in each of the full direction-dependent coincidence bands BBKu and BBKd of elevator B. The signal 0 produced in lead BLNBKd in downward direction of the step-by-step switching device St produces in this position 12 an output 1 at element B75 resulting in the following output states of the memory elements MDi and BMDi:

$$BDia=0-BDib=1$$

$Dib=0-Dia=1$. Consequently a signal change from 0 to 1 in lead LDia and from 1 to 0 in lead BLia takes place. The signal 0 produced in upward direction of the step-by-step switching device St in lead BLNBKu produces in position 12 an output 1 at element B76, this having no influence onto the memory elements MDi and BMDi.

The above mentioned signals in the leads LDia and BLDia also appear when the assumed calls are present and result in that the signal from the call DAd15 appears over the elements NBDid (FIG. 24), BDid and NBtot in the band Btot of elevator A while this signal is suppressed in the band DBtot of elevator B. These signals in the leads LDia and BLDia further produce that the signals from the calls DAu11 and DAu13 appear over the elements BNBDiu, BBDiu and BNBtot in the band BBtot of elevator B while the same signals are suppressed in the band Btot of elevator A. Thus the travel of the elevator A is influenced by the call DAd15 and the travel of elevator B is influenced by the calls DAu11 and DAu13. These calls are attended by each elevator in the manner described with respect to the travel examples for elevator A.

When the nominal load of the cabin of elevator A is reached a continuous signal 1 is produced on lead LKVL which signal prevent the elements 75 and 76 from switching-in the memory element MDi and moreover switch-off the memory element BMDi. As consequently the lead LDia has a continuous signal 1 and the lead BLDia has a continuous signal 0, it is the elevator B that attends all outer calls.

The present invention was based on the control for an elevator plant having one or two elevators. According to FIG. 33 this control of the elevator plant is divided into two parts. The first part includes the control part associated to each elevator according to FIG. 34. The second part includes the common control part for both elevators consisting of FIGURES 18, 19, 21 and 22. For an elevator plant having only one elevator the control consists of the control part associated to the elevator, and of the common control part. In an elevator plant having more than two elevators the control consists of the control part associated to each elevator and of the common control part. In this case the outer calls are distributed to all elevators in a manner similar to that described for the mentioned elevator plant with two elevators. The preceding description shows that with a control according to the invention it is possible in a very simple manner to construct an elevator plant having substantial economical advantages.

The elevator plant described in the preceding example is provided with a collective control in which the elevator may be differently influenced by the outer calls "up" and "down." There are of course also collective controls known in which only one outer call is present for each floor. The described control method may also be used for this type of collective controls whereby only one outer call band is formed instead of two.

We claim:
1. A completely solid-state, relay-free electronic control system for an elevator plant including a plurality of elevators, each of said elevators serving a plurality of floors comprising: a single means for generating time-dependent signals common to all of said elevators comprising time-dependent step-by-step switching means having switching positions the number of which corresponds with the number of floors being served, and means for continuously switching said time-dependent switching means between successive switching positions in one sense and, upon completion of the switching in said one sense, between successive switching positions in the opposite sense; a plurality of means for generating elevator position-dependent signals each associated, respectively, with each of said elevators comprising position-dependent step-by-step switching means having the same number of switching positions as said time-dependent switching means, and means responsive to movement of an elevator relative to each of said floors for switching said position-dependent switching means between positions in a direction in accordance with the movement of said elevator relative to the respective floors; and a plurality of means operable by said time-dependent signals and said position-depend- ent signals for controlling travel of an elevator between said floors each associated, respectively, with each of said elevators and comprising coincidence means responsive to said time-dependent and said position-dependent signals for producing coincidence band signals for indicating the periods during which the time-dependent and position-dependent switching means have corresponding instantaneous switching positions.

2. Apparatus as defined in claim 1 wherein said time-dependent signal generating means produces a first signal which is a function of the switching frequency of said time-dependent switching means, second signals which are a function of the sense of switching of said time-dependent switching means, and third signals which are a function of the instantaneous switching position of said time-dependent switching means; and further wherein said position-dependent signal generating means produces first and second signals which are a function of the instantaneous position of said position-dependent switching means, said coincidence means being responsive to said third time-dependent signals and said first position-dependent signals.

3. Apparatus as defined in claim 2, wherein each of said elevator control means includes means producing a resultant cabin call collective signal comprising
   a plurality of push-button signal generating means mounted in the cabin of an elevator, the number of said push-button signal generating means corresponding with the number of floors served by said elevator;
   a plurality of memory elements having inputs connected, respectively, with said push-button signal generating means and with said means generating said second position-dependent signals;
   a plurality of switching means responsive to the third time-dependent signals and to the signals stored in said memory elements, respectively;
   and collective means connected with each of said switching means for producing a resultant cabin call collective signal.

4. Apparatus as defined in claim 3 wherein said elevator control means further includes comparison circuit means comprising first switching means for comparing the resultant cabin call collective signal and the first time-dependent signal to produce a cabin call band signal.

5. Apparatus as defined in claim 4, and further including means for producing a resultant outer call "down" signal, comprising
   a plurality of "down" push button signal generating means physically arranged adjacent each of the floors being served, respectively;
   a plurality of memory elements having inputs connected, respectively, with said "down" push-button signal generating means;
   a plurality of switching means responsive, respectively, to the signals stored in said memory elements and to said third time-dependent signals;
   and collective means connected with each of said switching means for producing a resultant outer call "down" signal.

6. Apparatus as defined in claim 5, and further including means for producing a resultant outer call "up" signal, comprising
   a plurality of "up" push button signal generating means physically arranged adjacent each of the floors being served, respectively;
   a plurality of memory elements having inputs connected with said "up" push button signal generating means, respectively;
   a plurality of switching means responsive, respectively, to the signals stored in said memory elements, and to said third time-dependent signals;
   and collective means connected with each of said switching means for producing a resultant outer call "up" signal.

7. Apparatus as defined in claim 6, wherein said comparison circuit means includes second switching means responsive to said outer call "up" signal, said first time-dependent signal and to one of the second time-dependent signals for producing an "up" outer call band signal; third switching means responsive to said outer call "down" signal, said first time-dependent signal and the other second time-dependent signal for producing a "down" outer call band signal; and fourth switching means responsive to said cabin call band signal and to said "up" and "down" outer call band signals for producing a sum band signal.

8. Apparatus as defined in claim 7 and further including travel direction determining means having means for forming semi-directional signals, comprising
   a pair of switching means one of which is responsive to said coincidence band signal and to one of said second time-dependent signals, the other of said switching means being responsive to said coincidence band signal and to the other of said second time-dependent signals.

9. Apparatus as defined in claim 8 wherein said travel direction determining means includes means for forming full-directional signals comprising
   a pair of switching means a first one of which is responsive to the said coincidence band signal, to one of said second time-dependent signals, and to a first travel-direction feedback signal, the other of said switching means being responsive to said coincidence band signal, to the other of the second time-dependent signals, and to a second travel-direction feedback signal.

10. Apparatus as defined in claim 9 wherein said travel direction determining means includes memory means having a pair of cross-coupled elements the inputs of which are connected, respectively, with said switching devices supplying said semi-directional coincidence band signals, said memory means serving to store the semi-directional signals in such a manner that the signal of the one coincidence band is maintained by storing until the signal of the other coincidence band appears so that the output signal of the one element remains during the passage through the positions of the time-dependent step-by-step switching means and the output signal of the other elements is maintained during the passage through the positions of said time-dependent switching means below the cabin position.

11. Apparatus as defined in claim 10, wherein said travel direction determining means further includes a pair of switching means for predetermining travel direction, each of said switching means being responsive to said sum call band and to said coincidence band signals, one of said switching means being responsive also to the semi-directional signals stored in one element of the associated memory element, the other of said switching means being responsive also to the semi-directional signals stored in the other element of said memory element;
   and a pair of additional storage means connected, respectively, with said switching means for storing resultant upward and downward travel direction signals, respectively, said additional storage means being reciprocably cross-coupled.

12. Apparatus as defined in claim 11, and further including means controlling the stopping of an elevator at a desired floor, comprising
   first and second stop switching means both of which are responsive to the sum band signal, one of said stop switching means being responsive also to one full-directional band signal and the other being responsive to the other full-directional band signal, said first stop switching means producing an output signal which predetermines the stops for the direction calls for upward travel and said second stop switching means producing an output signal which predetermines the stops for the direction calls for downward travel.

13. Apparatus as defined in claim 12 wherein said stop controlling means further includes
first storage means including a pair of cross-coupled switching elements for determining the presence of a call above the instantaneous cabin position, one of said switching elements being responsive to the signal predetermining upward travel movement, and the other being responsive to a signal produced by said time-dependent signal means during the passage of the time-dependent switching means through the position below the cabin position;
and up-counter-travel switching means responsive to the output of said first storage means, to the coincidence band signal, to one direction of movement signal of the position-dependent switching means, and to the other direction of movement signal of said time-dependent switching means, said up-counter-travel switching means producing an up-counter-travel output signal which predetermines the stop if no more calls are present above the position of the position-dependent switching means.

14. Apparatus as defined in claim 13 wherein said stop controlling means includes second storage means including a pair of cross-coupled switching means for determining the presence of a call below the instantaneous cabin position, one of said switching means being responsive to the signal predetermining downward travel movement, and the other being responsive to a signal produced by said time-dependent signal means during the passage of the time-dependent switching means through the position above the cabin position;
and down-counter-travel switching means responsive to the output of said second storage means, to the coincidence band signal, to one direction of movement signal of the position-dependent switching means, and to the other direction of movement signal of said time-dependent switching means, said down-counter-travel switching means producing a down-counter-travel output signal which predetermines the stop if no more calls are present below the position of the position-dependent switching means.

15. Apparatus as defined in claim 14 wherein said stop controlling means further includes third storing means for determining the travel distance of an elevator, said third storing means including travel initiative switching means for determining the initiation of travel and travel interruption switching means for determining travel interruption.

16. Apparatus as defined in claim 15 wherein said up-counter-travel and said down-counter-travel switching means are connected with a stop memory storing device, and further wherein said travel initiating means is responsive to a safety signal produced by the elevator motor and brake operating means, to an output signal produced by switching means which are responsive to both travel direction signals, and to output signals from said stop memory storing device.

17. Apparatus as defined in claim 16 wherein said travel interruption switching means is responsive to the position-dependent sequence signal of said position-dependent switching means, to the signals stored in said stop memory storing device, and to a signal produced by decelerated "nor"-circuit switching means which are responsive to said position-dependent sequence signal.

18. Apparatus as defined in claim 17, and further including distributing circuit means connected with a plurality of the elevators of the plant for generating and distributing command signals thereto, distributing circuit means being responsive to the full-directional responsive coincidence band signals associated with said elevators whereby each elevator receives command signals in accordance with its instantaneous position and with its running direction.

19. Apparatus as defined in claim 18 wherein said distributing means includes, associated with each elevator, a pair of distributing switching means both of which are responsive to full-load signals produced by elevator load sensing means, one of said distributing switching means being responsive to one full-directional signal, and the other being responsive to the other full-directional signal, and a distributing signal storing means connected with both of said distributing switching means, said storing means being connected with corresponding distributing storing means associated with another elevator.

20. Apparatus as defined in claim 19 wherein said comparison circuit means further includes fifth and sixth switching means both of which are responsive to said full-load signals and to the command signals of said distributing circuit means, said fifth switching means being responsive also to the outer call band "up" signal produced by said second switching means and said sixth switching means being responsive also to the outer call band "down" signal produced by said third switching means.

21. Apparatus as defined in claim 20 wherein each of the switching means of said time-dependent switching means, said position-dependent switching means, said cabin call signal generating means, said outer call "down" signal generating means, said outer call "up" signal generating means, said coincidence circuit means, said comparison circuit means, said travel direction determining means, said stop determining means and said distributing means comprises logic circuit means consisting of solid-state switching elements.

22. A completely solid-state, relay-free electronic control system for an elevator plant including a plurality of elevators, each of said elevators serving a plurality of floors, comprising: a single means for generating time-dependent signals common to all of said elevators comprising time-dependent step-by-step switching means having switching positions the number of which corresponds with the number of floors being served, and means for continuously switching said time-dependent switching means between successive switching positions in one sense and, upon completion of the switching in said one sense, between successive switching positions in the opposite sense; a plurality of means for generating elevator position-dependent signals each associated, respectively, with each of said elevators comprising position-dependent step-by-step switching means having the same number of switching positions as said time-dependent switching means, and means responsive to movement of an elevator relative to each of said floors for switching said position-dependent switching means between positions in a direction in accordance with the movement of said elevator relation to the respective floors; and a plurality of means operable by said time-dependent signals and said position-dependent signals for controlling travel of an elevator between said floors each associated, respectively, with each of said elevators and comprising means for generating cabin call signals in response to command signals developed by a passenger of the elevator in the cabin thereof; means for generating outer call "down" signals by a prospective passenger at a floor being served by an elevator; means for generating outer call "up" signals by a prospective passenger at a floor being served by the elevator; coincidence circuit means for generating a signal indicative of said time-dependent and position-dependent switching means having the same instantaneous position; means for determining the travel direction of an elevator; means for determining the stopping of an elevator; means for generating a signal as a function of the load of an elevator; means for distributing the command signals upon the various elevators of the system in accordance with their instantaneous loads, travel direction and position; comparison circuit means for generating a sum band signal as a function of the outputs of said time-dependent and position-dependent switching means, said travel direction determining means, said stop determining means, said coincidence circuit means, said load-responsive signal generating means and said distributing means, said sum band signal being applied to said travel direction determining means and said stop determining means to control the operation thereof; and reversible motor means, braking means and door operating means operable in response to output signals from said travel direction and stop determining means for controlling the operation of said elevator.

23. Apparatus as defined in claim 22 wherein said time-dependent switching means, said position-dependent switching means, said cabin call signal generating means, said outer call "up" signal means, said outer call "down" signal means, said coincidence circuit means, said travel direction determining means, said stop determining means, said distributing means, and said comparison circuit means each includes switching means including logic circuit using solid-state elements.

References Cited in the file of this patent

UNITED STATES PATENTS

| | | |
|---|---|---|
| 2,767,908 | Thomas | Oct. 23, 1956 |
| 2,806,554 | Hall et al. | Sept. 17, 1957 |
| 2,833,376 | Burgy | May 6, 1958 |
| 2,835,346 | Burgy | May 20, 1958 |